(12) United States Patent
Fear et al.

(10) Patent No.: US 10,946,281 B2
(45) Date of Patent: Mar. 16, 2021

(54) USING PLAYSTYLE PATTERNS TO GENERATE VIRTUAL REPRESENTATIONS OF GAME PLAYERS

(71) Applicant: NVIDIA Corporation, San Jose, CA (US)

(72) Inventors: Andrew Fear, Cedar Park, TX (US); Brian Burke, Cedar Park, TX (US); Pillulta Venkata Naga Hanumath Prasad, Benguluru (IN); Abhishek Lalwani, Jaipur (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/369,458

(22) Filed: Mar. 29, 2019

(65) Prior Publication Data

US 2020/0306638 A1 Oct. 1, 2020

(51) Int. Cl.
*A63F 13/67* (2014.01)
*A63F 13/56* (2014.01)
(Continued)

(52) U.S. Cl.
CPC .............. *A63F 13/56* (2014.09); *A63F 13/67* (2014.09); *A63F 13/798* (2014.09); *G06N 3/088* (2013.01); *G06N 7/00* (2013.01); *A63F 13/49* (2014.09); *A63F 13/497* (2014.09); *A63F 13/60* (2014.09); *A63F 13/79* (2014.09); *A63F 2300/208* (2013.01); *A63F 2300/535* (2013.01);
(Continued)

(58) Field of Classification Search
CPC ........ A63F 13/49; A63F 13/497; A63F 13/60; A63F 13/67; A63F 13/79; A63F 13/798; A63F 2300/208; A63F 2300/535; A63F 2300/55; A63F 2300/5546; A63F 2300/558; A63F 2300/6027
See application file for complete search history.

(56) References Cited

U.S. PATENT DOCUMENTS

| | | | | |
|---|---|---|---|---|
| 6,024,643 A | * | 2/2000 | Begis | A63F 13/12 463/42 |
| 7,636,697 B1 | * | 12/2009 | Dobson | G06N 20/00 706/12 |

(Continued)

FOREIGN PATENT DOCUMENTS

| | | |
|---|---|---|
| WO | 2017004433 A1 | 1/2017 |
| WO | 2018017428 A1 | 1/2018 |
| WO | 2018106461 A1 | 6/2018 |

*Primary Examiner* — Steven J Hylinski
(74) *Attorney, Agent, or Firm* — Shook, Hardy & Bacon L.L.P.

(57) ABSTRACT

In various embodiments of the present disclosure, playstyle patterns of players are learned and used to generate virtual representations ("bots") of users. Systems and methods are disclosed that use game session data (e.g., metadata) from a plurality of game sessions of a game to learn playstyle patterns of users, based on user inputs of the user in view of variables presented within the game sessions. The game session data is applied to one or more machine learning models to learn playstyle patterns of the user for the game, and associated with a user profile of the user. Profile data representative of the user profile is then used to control or instantiate bots of the users, or of categories of users, according to the learned playstyle patterns.

20 Claims, 7 Drawing Sheets

(51) Int. Cl.
    *G06N 3/08*         (2006.01)
    *G06N 7/00*         (2006.01)
    *A63F 13/798*     (2014.01)
    *A63F 13/49*      (2014.01)
    *G06N 20/00*     (2019.01)
    *A63F 13/60*      (2014.01)
    *A63F 13/497*     (2014.01)
    *A63F 13/79*      (2014.01)

(52) U.S. Cl.
    CPC ..... *A63F 2300/55* (2013.01); *A63F 2300/558* (2013.01); *A63F 2300/5546* (2013.01); *A63F 2300/6027* (2013.01); *G06N 20/00* (2019.01)

(56) References Cited

U.S. PATENT DOCUMENTS

| | | | | |
|---|---|---|---|---|
| 8,357,045 | B2* | 1/2013 | Youm | A63F 13/10 463/42 |
| 8,444,490 | B2* | 5/2013 | Youm | A63F 13/795 463/4 |
| 9,471,924 | B2* | 10/2016 | Garbow | G06Q 30/02 |
| 10,137,376 | B2* | 11/2018 | Kohler | A63F 13/5252 |
| 2006/0246973 | A1* | 11/2006 | Thomas | A63F 13/42 463/4 |
| 2007/0054717 | A1* | 3/2007 | Youm | A63F 13/12 463/1 |
| 2007/0260567 | A1* | 11/2007 | Funge | A63F 13/10 706/47 |
| 2010/0160038 | A1 | 6/2010 | Youm et al. | |
| 2010/0178985 | A1* | 7/2010 | Chickering | A63F 13/60 463/42 |
| 2012/0123570 | A1* | 5/2012 | Guinn | G07F 17/32 700/91 |
| 2014/0187315 | A1 | 7/2014 | Perry | |
| 2014/0187317 | A1* | 7/2014 | Kohler | A63F 13/86 463/31 |
| 2014/0194211 | A1* | 7/2014 | Chimes | A63F 13/497 463/43 |
| 2015/0217198 | A1* | 8/2015 | Curtis | A63F 13/32 463/31 |
| 2015/0375101 | A1* | 12/2015 | George | A63F 13/35 463/24 |
| 2015/0375102 | A1* | 12/2015 | George | A63F 13/20 463/24 |
| 2015/0375103 | A1* | 12/2015 | George | A63F 13/86 463/24 |
| 2017/0087475 | A1 | 3/2017 | Perry | |
| 2018/0001205 | A1 | 1/2018 | Osman et al. | |
| 2018/0001206 | A1 | 1/2018 | Osman et al. | |
| 2018/0104587 | A1 | 4/2018 | Zachwieja et al. | |
| 2018/0243656 | A1 | 8/2018 | Aghdaie et al. | |
| 2018/0256981 | A1* | 9/2018 | Enomoto | A63F 13/67 |
| 2019/0060766 | A1* | 2/2019 | Perry | G06N 3/006 |

* cited by examiner

USING PLAYSTYLE PATTERNS TO GENERATE VIRTUAL REPRESENTATIONS OF GAME PLAYERS

BACKGROUND

As online multiplayer video games proliferate, and the games become more competitive, users are spending an increasing amount of time training to improve their skills within the games. In order to accomplish this, users are often seeking to play against better or higher ranked players than themselves. For example, when a user loses a game session to a specific player, the user may desire to recreate the game session by playing against the same player. However, the player from the previous game session may not be available or willing to play, especially when that player is from a rival professional team. In addition, the player may play another game session in a dissimilar fashion (e.g., the player may be more cautious than in the original game session or may take the game less seriously), thereby further decreasing the odds that a user is able to replicate a game session. While difficult to reproduce for a single player, the original game session becomes even more difficult to reproduce as more players are involved. As such, faithfully recreating the game session is not currently possible, thereby leading to missed opportunities for the user to learn from mistakes of the original game session or to try different techniques than in the original game session.

As another example, a user of a certain experience level (e.g., experience level 7) within a game may desire to move up to a higher experience level(s) (e.g., experience level 8) and, in order to do so, may seek to train for the higher experience level(s) by playing against players of the higher experience level(s). Additionally, a user may desire to play against players from a certain geographic location (e.g., a city, a state, a region, a country, etc.), such as to prepare for an international or regional tournament. However, algorithms for many games often put players of similar experience levels and/or geographic locations together, thereby limiting the opportunities for the user to find game sessions with players of different experience level(s) or from different geographic location(s). In addition, some users may want to train to play against players of a higher experience level(s), and/or against players from the geographic location(s), without actually playing against them in a game session that may affect the user's statistics within the game (e.g., kill/death ratio, wins, losses, goals against, yards allowed, etc.) or reveal the user's game strategies. In existing systems, this is not possible due to a variety of factors.

Conventional systems have allowed users to play against bots without or in addition to human teammates and/or opponents. However, these bots do not allow the users to realistically train for game play against human players, much less specific persons. This is because the behavior of bots in games is traditionally defined by human game developers during design of a game using rigid rules, and the only dynamic quality of the bots may be responsive to the game play of a user (e.g., using dynamic game difficulty balancing). Also, these bots are typically designed to maximize entertainment value, rather than to behave like humans. As a result, when a user plays a game against these bots, the game play is often unrealistic. Additionally, the programming of these bots is not representative of any specific user, of users of a specific experience level within the game, of users from a certain geographic location, and/or of users from another type of user category.

SUMMARY

Embodiments of the present disclosure relate to using learned playstyle patterns to generate virtual representations ("bots") of users. Systems and methods are disclosed that use game session data (e.g., metadata) from a plurality of game sessions of a game to learn playstyle patterns of users, and to control or instantiate bots of the users, or of categories of users, according to the learned playstyle patterns.

In contrast to conventional systems, such as those described above, the present system tracks game session data of users as the users play in a multitude of game sessions of a game. According to some examples, the game session data may be tracked for durations of time or for a discrete play period as defined by the user (e.g., via actuation of a button or opt-in field in a graphical user interface). The game session data may include data representing the game state, inputs of the users, the results of those inputs (e.g., the changes to the environments, the health or strength of various players in the game, the location of vehicles in the game, the location of a sports ball, etc.), the variables in the game session surrounding the inputs of the users (e.g., in a field, user sprints, then sees a rock, hides behind the rock, uses the rock as cover between firing a weapon), and/or other data. The game session data for a specific user can be identified over any number of game sessions, and the game session data may be used to learn playstyle patterns of the user (e.g., by applying the game session data to machine learning model(s)). In one or more examples, the game session data collected for each game or play period may include image data, audio data, and any user inputs— including, without limitation: keys pressed on a keyboard, cursor movement and/or actuation, head or body movement (as detected by sensors in a head-mounted display, for example) and audio inputs, such as voice commands. A user profile may be created and/or updated to capture the playstyle patterns of the user for the game in any of a variety of scenarios (e.g., in different game modes, such as team death match or capture the flag) and in response to a variety of situations or stimuli.

The user profile may then be used when a request is received to play or replay a game session against the player associated with the user profile. For example, the user profile, or at least playstyle patterns from the user profile associated with the game session, may be used to control an instantiation of a virtual representation ("bot") of the player in the game session. As a result, a player can play against a bot of another player that they may have enjoyed playing with or against, that they previously lost to, that they know is a stronger player, and/or that they anticipate future competition with, for example. In addition, even in instances where a first player that a user desires to play against does not have an associated user profile, a user profile of a second player may be selected as the user profile for the first player based on a similarity between a playstyle (and/or other characteristics) of the first player in a game session and the playstyle patterns (and/or other characteristics) of the second player from the user profile. By enabling game play against bots controlled according to playstyle patterns of actual players, the challenges faced by conventional systems—e.g., ensuring that a certain player is available for the subsequent game session—are no longer an issue.

In further contrast to conventional systems, the present system generates bots based on observations of users (e.g., by crowdsourcing game session data of a multitude of users to learn how they play), where the bots both reactively and proactively behave like the users (e.g., like a single user, like a category or users, etc.). For example, where a bot is to behave like a category of users, an aggregate playstyle of a number of users may be determined (e.g., by applying game session metadata corresponding to the users to a machine learning model(s)). The bot may then be controlled according to the aggregate playstyle patterns of the users. Specific categories of users may be selected (e.g., based on experience level within a game, based on geographic location, based on national rank, based on world-wide rank, etc.), and the aggregate playstyles for the categories may be learned. As a result, when a user requests to play against a bot(s) of a certain category, an instantiation of the bot(s) can be controlled according to the aggregate playstyle patterns of the category. Thus, in contrast to the above described deficiencies of conventional systems, the user is able to play against a more human-like bot representative of users of a higher experience level(s), users from a specific geographic location, users of a certain regional rank (e.g., within the top 10% regionally), national rank (e.g., users within between top 60% and top 70%), world-wide rank, and/or users of another user category, without actually playing against real players in a game session that may affect the user's statistics within the game.

By enabling game play against bots that are controlled according to playstyle patterns of a user, or of a category of users, a player does not need to participate in multiple instances of a game in order to play (or attempt a replay) against a particular player, or to play against a particular type of player (e.g., a player of a specific experience level in the game). As a result, the player can participate in a tailored game session that includes bots representative of players or a category of players of interest to the player without each of the players or players from the category being present (e.g., requiring their own instantiation of the game session). In addition, because the network may only need to manage network connections with client devices of human players (e.g., because other players may be replaced by virtual representations), networking requirements may also be reduced when compared to conventional systems.

BRIEF DESCRIPTION OF THE DRAWINGS

The present systems and methods for using learned playstyle patterns to generate virtual representations of users is described in detail below with reference to the attached drawing figures, wherein.

DETAILED DESCRIPTION

Figure 1:
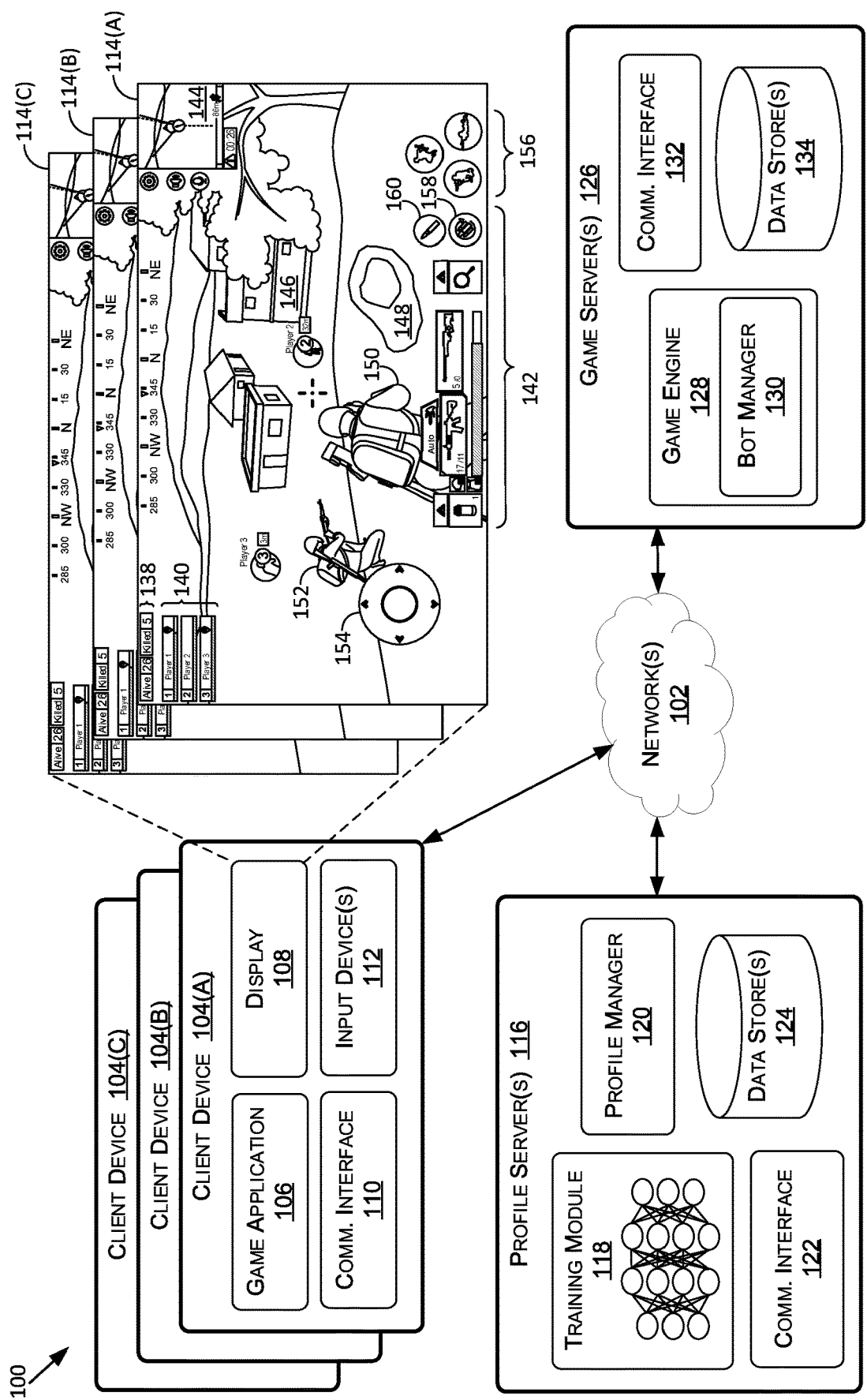
FIG. 1 is an example system diagram of a bot training system, in accordance with some embodiments of the present disclosure.

Systems and methods are disclosed related to using learned playstyle patterns to control virtual representations ("bots") of users. For example, in contrast to conventional systems, playstyle patterns of users are learned using a machine learning model(s), and instantiations of bots are controlled according to the playstyle patterns. As a result, the bot is not only more human-like than existing bots, but users are able to play against a virtual representation of another player (e.g., a player the user lost to in the past, a player who is better than the user, a player the user may face in real-time in the future, a specific well-known player, etc.), or a virtual representation of a category of players (e.g., players of a certain experience level, players from a specific geographic location, etc.), without considering availability of a specific player, or without endlessly searching for a game session with players of a specific category (who even, if found, may not behave in a manner representative of the overall category).

For individual users, a user profile may be created based on observations of the user through a number of game sessions of a game over time. For example, game session data from games participated in by the user may be applied to a machine learning model(s) trained to learn playstyle patterns of the user. In one or more examples, a model of a user's behavior (e.g., a bot) may be trained from as little as a single game session data. Subsequent game play sessions may result in the generation of a corresponding number of bots, which may be collected and stored in a repository of bots generated for a particular user. Each discrete bot may be incrementally added to a continuously updating model of the user's behavior over time. By discretizing individual game sessions, a user may be able to capture specific performances and performance levels as bots, as well as a comprehensive representation of the user's patterns, tactics, and playstyles. These user models may be associated with the user account of the user. As such, when another player wants to play a game session against the user (or a virtual representation of the user), an instantiation of a bot may be controlled according to the overall playstyle patterns of the user from the user profile. In further examples, the instantiation of the bot may be controlled according to the user's performance as captured over a particular game session (e.g., in a particular contest or competition).

For a category of users, a user category profile may be created based on observations of users from the category through a single game session, and/or a number of game sessions over time. Game session data from games participated in by the users of the category may be applied to a machine learning model(s) trained to learn playstyle patterns of the users, which can be aggregate over time and from game session data incrementally captured in subsequent individual game sessions. The aggregate playstyle patterns of the users may be associated with the user category profile. In such an example, when a player wants to play a game session against a bot, or bots, of a certain category (e.g., players of a higher experience level, players from a certain geographic area, etc.), an instantiation of a bot may be controlled according to the aggregate playstyle patterns of the users from the user category.

As a direct result of some embodiments of the systems and methods described herein, the processing, energy, and bandwidth requirements of the system are reduced because fewer instances of a game session need to be loaded (e.g., the instances of the game session being played by actual users may be loaded, while the instances of the game session for the players replaced by the bot(s) do not need to be loaded, as compared to conventional systems where an instance of the game session needs to be loaded for each player). In addition, because only users who are actively participating in the game session need to connect to the system over the network, the networking requirements are also reduced, and the integrity of the system is more likely to be maintained as compared to conventional systems (e.g., less lag, less drop offs, more consistent game play, etc.). Thus, the user is able to accomplish the same goals—e.g., of training for a game by playing against specific players or types of players—while reducing the burden on the system and the network(s) supporting the system.

With reference to FIG. 1, FIG. 1 is an example system diagram of a bot training system 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The bot training system 100 may include, among other things, client devices 104(A), 104(B), and 104(C) (referred to collectively herein as "client devices 104"), a profile server(s) 116, and/or a game server(s) 126. Although the client devices 104(A), 104(B), and 104(C) are illustrated in FIG. 1, this is not intended to be limiting. In any example, there may be any number of client devices 104. The bot training system 100 (and the components and/or features thereof) may be implemented using one or more computing devices, such as the computing device 700 of FIG. 7, described in more detail below.

Components of the bot training system 100 may communicate over network(s) 102. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the bot training system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), an NVIDIA SHIELD, a smart-home device that may include an intelligent personal assistant (e.g., an AMAZON ECHO, a GOOGLE HOME, etc.), and/or another type of device capable of supporting game play.

The client devices 104 may include a game application 106, a display 108, a communication interface 110, and an input device(s) 112. Although only a few components and/or features of the client device 104 are illustrated in FIG. 1, this is not intended to be limiting. For example, the client devices 104 may additional or alternative components, such as those described below with respect to the computing device 700 of FIG. 7.

The game application 106 may be a mobile application, a computer application, a console application, and/or another type of application. The game application 106 may include instructions that, when executed by a processor(s), cause the processor(s) to, without limitation, receive input data representative of user inputs to the one or more input device(s) 112, transmit the input data to the profile server(s) 116 and/or the game server(s) 126, retrieve game data from memory or local storage, receive the game data using the communication interface 110 from the profile server(s) 116 and/or the game server(s) 126, and cause display of the game on the display 108. In other words, the game application 106 may operate as a facilitator for enabling playing of a game associated with the game application on the client devices 104.

The game application 106 and/or patches or updates to the game application 106 may be downloaded from the game server(s) 126 or may be downloaded from another server(s), such as a server of a content delivery network (CDN). For example, the game server(s) 126 may be located in a different country or on a different continent, so to reduce the download time, the game application 106 and/or the patches or updates may be stored on different servers around the globe. As such, when the client devices 104 are downloading the game application 106 and/or the patches or updates, the client devices 104 may connect to a more local server that is part of the CDN, for example.

In some examples, the client devices 104 may render the game using the game application 106, while in other examples, the client devices 104 may receive display data (e.g., encoded display data, as described with respect to FIG. 6) and use the display data to display the game on the display 108. In some examples, a first client device, such as client device 104(A), may render the game while a second client device, such as client device 104(B), may receive the display data and display the game using the display data. In examples where the display data is received by the client device (e.g., where the client device 104 does not generate the rendering), the bot training system 100 may be part of a game streaming system, such as the game streaming system 600 of FIG. 6, described in more detail below.

The client device 104(A) may display, via the display 108, plurality of game sessions over time, such as game session 114(A), game session 114(B), and game session 114(C) (referred to collectively herein as "game sessions 114"). The game sessions 114 may include any number of game sessions participated in by the user of the client device 104(A). Similarly, users of each of the client devices 114, in addition to the client device 104(A), may participate in any number of game sessions 114. As described herein, after opt-in by a user, game session data representative of the game sessions 114 may be used to generate a user profile (e.g., by the profile server(s) 116) for the user, where the user profile includes playstyle patterns of the user learned from the game session data. The playstyle patterns from a user profile may then be used to control an instantiation of a bot within another game session.

The display 108 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the game. The input device(s) may include a keyboard, a mouse, a touch-screen display, a controller(s), a remote(s), a headset (e.g., sensors of a virtual reality headset), and/or other types of input devices.

The communication interface 110 may include one or more components and features for communicating across one or more networks, such as the network(s) 102. The communication interface 110 may be configured to communicate via any number of network(s) 102, described herein. For example, to communicate in the bot training system 100 of FIG. 1, the client devices 104 may use an Ethernet or Wi-Fi connection through a router to access the Internet in order to communicate with the profile server(s) 116, the game server(s) 126, and/or with other client devices 104.

The profile server(s) 116 may include one or more servers for generating, updating, managing, and storing previously generated user bots, user profiles, and/or user category profiles. Although only a few components and/or features of the profile server(s) 116 are illustrated in FIG. 1, this is not intended to be limiting. For example, the profile server(s) 116 may include additional or alternative components, such as those described below with respect to the computing device 700 of FIG. 7.

As further illustrated in FIG. 1, the profile server(s) 116 may be separate or distinct from the game server(s) 126; however, this is not intended to be limiting. For example, in some examples, the profile server(s) 116 may be the same or similar servers to the game server(s) 126. In some examples, the profile server(s) 116 may be operated or hosted by a first entity (e.g., a first company) and the game server(s) 126 may be operated or hosted by a second entity (e.g., a second, different company). In such examples, the second entity may be a game developer, and the first entity and the second entity may share data such that the first entity can develop the user profiles using data received from the second entity, and the second entity can receive user profiles (or profile data from the user profiles) from the first entity for controlling bots according to the user profiles (e.g., according to playstyle patterns from the user profiles). In other examples, the profile server(s) 116 and the game server(s) 126 may be operated or hosted by the same entity.

The profile server(s) 116 may include one or more application programming interfaces (APIs) to enable communication of information (e.g., user profiles, user category profiles, game session data, etc.) with the game server(s) 126. For example, the profile server(s) 116 may include one or more game APIs that interface with a game engine 128 (and/or a bot manager 130) of the game server(s) 126 to receive game session data for creating user profiles and/or user category profiles. As a further example, the profile server(s) 116 may include one or more APIs that interface with the game engine 128 (and/or the bot manager 130) for transmitting profile data (e.g., in response to request from the game server(s) 126) to enable the game server(s) 126 to generate instantiations of bots using the profile data. Although different APIs are described herein, the APIs may be part of a single API, two or more of the APIs may be combined, different APIs may be included other than those described as examples herein, or a combination thereof.

In alternative and/or further examples, image data generated during a game session may be stored along with user inputs—such as, without limitation, keyboard key presses; cursor movement, motion, or position; head or body poses, positions, orientations, and gestures; and audio inputs including commands—that can be mapped to a particular frame (which may include both video and audio frame data). Objects, circumstances, or scenarios presented in a frame may be mapped to user input by using classification algorithms that define or classify a set of parameters that may be present in a frame and the input that was received from the user.

The particular classification algorithm used can vary depending on the type of input. For example, for a binary type input such as a specific key being pressed or a button being actuated, a logistic regression algorithm may be used. In contrast, when the input is a movement of a cursor, a linear regression algorithm can be used to correlate image data with user input. A bot is thereafter generated such that a user input or user action that is mapped to a set of frame parameters is performed anytime another frame is rendered that has an equivalent or near equivalent (e.g., above a threshold) set of parameters. Frame parameters may include when a particular item or object appears in the frame, when an adversary appears in the frame, where an adversary appears in the frame, user behavior when equipped with a particular item or under a particular game effect, where an audible noise is generated relative to the perspective of a frame, etc. Bot generation using frame data can be utilized when APIs are unavailable or inaccessible, for example, or can be used to supplement a user's bot generated using game session data acquired by the profile server through one or more APIs.

The profile server(s) 116 may include a training module 118 for learning playstyle patterns of users and/or aggregate playstyle patterns of groups or categories of users. Although FIG. 1 includes an illustration of a neural network, this is not intended to be limiting. For example, the training module 118 may be used to train any type of machine learning model, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

Game session data may be applied to machine learning model(s) of the training module 118, where the machine learning model(s) learn the playstyle patterns and/or the aggregate playstyle patterns from the game session data. In some examples, the game session data may be applied to one or more machine learning models (e.g., neural networks) to be trained using reinforcement learning or inverse reinforcement learning. For example, to learn playstyle patterns of a user, inverse reinforcement learning may be used to observe behavior or playstyle of a user (e.g., using user input data, player data, environment data, etc., as described herein) through many game sessions and learn the user's objectives, values, or rewards. The game session data may be stored in data store(s) 124. In addition, the user profiles may be stored in the data store(s) 124.

The game session data may include game state data, user input data, player data, environment data, image data, audio data, and/or other data representing game sessions of a game. For example, the game state data may include data snapshots (either acquired via one or more APIs, or derived from one or more audio and video frames, as particular non-limiting examples) representative of a game session at each point in time and/or in response to changes to the game sessions (e.g., objects moving or being left behind, values changing, such as health of players, hit counts, etc., characters moving about the environment, etc.). As such, the game state data represents the environment, the objects, the values, and/or other information of the game session throughout the game session. The game state data may be stored with associated time stamps (e.g., as metadata).

The game state data for a game session may, in some examples, include data that enables recreating the game session at any and all points (or a subset thereof) within the game session. For example, the game state data may include data representing the states of objects (e.g., game environment objects such as buildings, windows, trees, rocks, boxes, barrels, explosive items, doors, sports balls, barriers such as walls and doors, etc.), players (e.g., virtual characters within the game controlled by users), bots (e.g., game bots, virtual representations of users controlled according to playstyle patterns of users, etc.), statistics, and/or other features of the game session. In other words, the game state data may include enough data that, upon request to replay a previous game session from a specific point in time of the previous game session (e.g., from the beginning, from a time of interest, from before elimination, etc.), a new game session can be loaded that represents the previous game session at the specific point in time.

However, in some examples, the new game session may include different players, bots, equipment, etc. (e.g., as selected by a user during setup of a new or replayed game session). In such examples, at least some of the game state data from the previous game session may be used, and new or updated game state data may be used to load the new game session (e.g., players may be replaced by bots representing the players, different players may be added to the game, equipment or items may be swapped for other equipment or items, objects may be loaded in alternate states (e.g., an exploded bridge may be loaded in an unexploded state, a locked door may be unlocked, etc.). With reference to the game session 114(A) (e.g., a first person shooter (FPS) type game), the game state data may include information about the players in the game (e.g., Player 1, Player 2, and Player 3 indicated by the player region 140 of the game session 114(A), how many and which of the players are alive or dead at any given time, as indicated by region 138 of the game session 114(A), etc.), the location of player 150 (indicated by a corresponding character in FIG. 1) and player 152 (indicated by a corresponding character in FIG. 1) as the players (e.g., characters controlled thereby) move about the environment, the stance of player 150 and player 152 (e.g., crouched as illustrated in FIG. 1), statistics or player attributes of the players (e.g., strength, speed, stamina, damage, etc.), etc. The game state data may further include how many players are alive or dead (e.g., as represented in the region 138), each of the players and/or bots that are in the game (e.g., each of the players in the player listing 140), the health of each of the players (e.g., player status) and/or bots, the weapons and/or items each of the players and/or bots is carrying (e.g., as indicated by the status region 142 of the game session 114(A)), etc. The game state data may further include a state of objects (e.g., environmental objects), such as the rock 148, the building 146 (and/or the other buildings), trees, etc.

Although various examples are described herein with respect to a first person shooter (FPS) type game, this is not intended to be limiting and may apply to various competitive and/or cooperative games, and eSports games in particular that can include, without limitation, racing, sports simulation, real-time strategy, collectible card game simulations, massively multiplayer online games, platform games, etc. For example, the game state data may include, for a sports simulation game, locations of players on the field or court at each point in time, locations of the sports ball at each point in time, the score, the stamina or energy of the players or bots, etc. As another example, the game state data may include, for a strategy game (e.g., a real-time strategy game), locations of pieces on a board or map or within an environment, hit points for different objects in the environment (e.g., a gun turret, a castle, a barrier, etc.), days until maturity for crops, etc.

The user input data may be data that represents the inputs to the input device(s) 112 by a user. For example, to control a character in a game or to otherwise interact with a game, a user may provide inputs using a keyboard, a mouse, a controller, a touch-screen, etc. These inputs may be stored as the user input data. User input data may also include observed or detected data that may not include any interaction with a user interface, such as head or body movements (as detected by one or more sensors, for example) or audio inputs (as produced in-application, or generated by a user and detected by a microphone).

With reference to the game session 114(A), the user input data may represent inputs to a control pad 154 (e.g., for moving about the virtual environment), to the stance control elements 156 (e.g., to jump, go prone, kneel, etc.), to a reload control element 158 (e.g., to reload a currently equipped weapon), to a trigger control element 160 (e.g., to fire a currently equipped weapon), a user's response to certain visual and/or audio stimuli, etc. Each of these inputs may be stored with a corresponding time stamp. As such, when the profile server(s) 116 is using the game session data to generate a user profile, the user input data can be analyzed in view of the other game session data (e.g., the game state data, the player data, the environment data, the video data, and/or other data) at the time, or at times, corresponding to the time stamp. Although the example of the control pad 154 is used, the examples may equally apply to one or more other input devices, such as a keyboard and mouse.

With reference to a sports type game, the user input data may represent inputs to a control pad or joystick (e.g., for moving about the virtual field or court), inputs to a keyboard or buttons on a controller (e.g., for kicking a ball, throwing a ball, diving, catching, spinning, etc.). With reference to a strategy type game, the user input data may represent inputs to a control pad or joystick for placing objects or moving objects in an environment (e.g., game pieces, buildings, towers, walls, players, crops, animals, etc.), inputs to buttons of a controller or keyboard for interacting with the objects (e.g., harvesting crops, removing buildings, towers, etc., moving game pieces, updating objects to have more strength or hit power, etc.).

The player data may be data that represents the players of the game, such as the experience level of the player (e.g., experience level 8, experience level 9, master level, sorcery level, etc.), the equipment of the player (e.g., weapons, items, currency, etc.), the stats of the player (e.g., strength, speed, defense, etc.), and/or other data representing the player. The player data may be included within or inferred from the game state data, may be separate from the game state data (e.g., all of the equipment or items available to a user may be stored in the player data, but a user may not use or have access to all of the equipment or items in a game session, so this player data may be separate from the game state data), or a combination thereof.

The environment data may include environments within the game that a user is in (e.g., in a tunnel, in a field, behind a rock, in the red-zone of a football field, in the penalty area of a soccer field, on the ropes of a boxing ring, near the side boards of a hockey rink, etc.). The environment data may be user specific data from the game state data (e.g., the coordinates of a specific user within the environment). As such, the environment data may be included within or inferred from the game state data, may be separate from the game state data, or a combination thereof.

With reference to the game session 114(A), the environment data may include the types and sounds of objects in the environment (e.g., the player 152 in the field of view of the player 150, the rock 148, the building 146, etc.). For example, from this environment data, it may be learned (e.g., by one or more machine learning models) that the player 150 is cautious when entering an area with enclosed structures (e.g., the building, including the building 146), and that the player 150 may crouch when able to hide behind an object, such as the rock 148.

With reference to a sports type game, the environment data may represent locations within the field of play of the character controlled by the user (e.g., near the boards in hockey, the user may play more aggressively, near the goal, the user may shoot more often than pass, etc.) and/or the other players in the vicinity of the player in the environment (e.g., in a football game, a user may avoid contact as much as possible, while another user may try to run over other players and/or bots), for example. With reference to a strategy type game, the environment data may represent the types of objects or game pieces in the environment (e.g., game pieces, buildings, towers, walls, players, crops, animals, etc.), and/or the locations of the game pieces (e.g., within striking distance of the user's objects or game pieces, within striking distance of particular objects or game pieces, etc.).

The image data may include screenshots, images, and/or video of a game session. For example, during a game session and/or after the game session, image data representing a display or a screenshot of one or more of the users may be captured. For a specific user, the screen of the user may be captured during and/or after the game session. This may include taking screenshots, capturing video, etc. In some examples, at least some of the environment data is derived the image data. The image data may be useful to a machine learning model (e.g., a convolutional neural network) in learning a correlation between what a user sees and the inputs of the user (e.g., as represented in the input data). Additionally, or alternatively, this player perspective data may be derived from the game session data without necessarily using the image data and/or other game session data may be used to interpret the image data. For a machine learning model that is trained using reinforcement learning or inverse reinforcement learning, for example, the image data and/or player perspective data may be at least one data type used to learn the playstyle patterns of a user.

In-application audio frame data can include, without limitation, sounds and noises (gunfire, explosions, movement, power-ups, etc.) generated during the rendering and production of data in the application. In a first person shooter game for example, an explosion or gunfire outside the immediate field of view of the player that prompts the user to react to the source(s) of the noise may be included along with the user response (e.g., turn away or avoid the source of the sound, turn towards and approach, etc.) in the data that is collected, this behavioral response can thereafter be mapped to subsequent instances of the sound under similar conditions. Likewise, in a horror or survival game, the sound of (for example and without limitation) onrushing footsteps or otherwise approaching noises may be collected and associated with the in-application source of the audio input, and any responsive user inputs (e.g., turn and face the source of the noise, avoid certain entities, flee from certain entities, etc.).

The environment data, the image data, the player perspective data, or a combination thereof may be used to determine environmental characteristics (e.g., characteristics of a virtual environment) of a character (e.g., of an avatar in a game) controlled by a user. The environmental characteristics may be used to determine the type of user inputs that the user makes in view of the environment characteristics. This may then be used to help determine playstyle patterns of the user (e.g., how the user reacts in different environments).

The game session data may then be used by the training module 118 (e.g., may be applied to machine learning model(s)) to learn playstyle patterns of a user for a discrete session, an aggregate playstyle pattern of the user, or aggregate playstyle patterns of a group or category of users. The playstyle patterns may then be associated with a user profile of a user or with a user category profile of a group or category of users in the profile manager 120. The profile manager 120 may be configured to generate, update, transmit, and/or otherwise manage the user profiles and/or the user category profiles.

The profile manager 120 may store playstyle patterns for a user or a category of users for each genre of game, for each game, for each game mode within each game, for each type of class within each game mode within each game, for each game mode and each level within the game, and so on. For example, an individual user profile may include playstyle patterns for the user for each of team death match and capture the flag game modes, or for each team a user plays with on a sports type game, etc. As such, when a user requests to play against a bot of the user associated with the user profile in a team death match game session, the bot may be controlled according to the playstyle patterns from the user profile associated with team death match. As another example, when a user request to play against a bot of the user associated with the user profile, where the user is playing as the New York Giants, the bot may be controlled according to the playstyle patterns from the user profile associated with the New York Giants.

In addition, the profile manager 120 may store playstyle patterns for more than one type of playstyle of a user. For example, a user may play cautiously in some games or under some circumstances, and aggressively others, even within the same game mode of a game. As such, the user profile may store playstyle patterns for the user for both an aggressive and a cautious playstyle. In some cases, the profile manager 120 may store intra-game context data regarding the user's playstyles. For example, the profile manager may learn that one user exhibits a cautious playstyle when close to death, whereas another user exhibits an aggressive playstyle when close to death (and/or in other defined contexts).

Communication interface 122 may include one or more components and features for communicating across one or more networks, such as the network(s) 102. The communication interface 122 may be configured to communicate via any number of network(s) 102, described herein. For example, to communicate in the bot training system 100 of FIG. 1, the profile server(s) 116 may communicate over a LAN with other profile server(s) 116 and/or over the Internet with other profile server(s) 116, the game server(s) 126, and/or the client devices 104.

The game server(s) 126 may include one or more servers (e.g., dedicated game servers) for storing, hosting, managing, and, in some examples, rendering a game. In some examples, first game server(s) 126 may be used to create, update, and modify a game (e.g., the program code of the game), and second game server(s) 126 may be used to host the game (e.g., as dedicated game servers). Although only a few components and/or features of the game server(s) 126 are illustrated in FIG. 1, this is not intended to be limiting. For example, the game server(s) 126 may include additional or alternative components, such as those described below with respect to the computing device 700 of FIG. 7.

The game server(s) 126 may include one or more APIs to enable game play by the client device(s) 104 and/or to enable communication of information (e.g., user profiles, user category profiles, game session data, etc.) with the profile server(s) 116. For example, the game server(s) 126 may include one or more game APIs that interface with the game applications 106 of the client devices 104 to enable game play by the client devices 104. As another example, the game server(s) 126 may include one or more game session APIs that interface with the profile manager 120 to pass game session data to the profile server(s) 116 for creating user profiles and/or user category profiles. As a further example, the game server(s) 126 may include one or more bot APIs that interface with the profile manager to receive the profile data for instantiating bots in game sessions of the game. Although different APIs are described herein, the APIs may be part of a single API, two or more of the APIs may be combined, different APIs may be included other than those described as examples herein, or a combination thereof.

The game server(s) 126 may include the game engine 128. The game engine 128 may include the functionality of a game that enables a game to be played by one or more users over a network. The game engine 128 may include a rendering engine, an audio engine, a physics engine, an animation engine, an artificial intelligence engine, a networking engine, a streaming engine, a memory management engine, and/or other components or features. The game engine 128 may be used to generate some or all of the game session data during a game session.

The game engine 128 may include the bot manager 130. For example, the bot manager 130 may be configured to instantiate bots using profile data from the user profiles generated by the profile server(s) 116 and/or from game session data from one or more selected game sessions. In one or more examples, a player may toggle a button or other interface element to begin recording game session data, which the player can re-toggle to stop further recording (a game session ending may likewise automatically stop further recording). The recorded game data can be used to train a player model, which can be used by the game engine 128 to instantiate a bot. In such an example, the game engine 128 may use the bot manager 130 to instantiate a bot in a new game session, and the game engine 128 may control the bot according the playstyle patterns from the user profile.

As an example, a user of the client device 104(A) may request, via the game application 106, to play a game session against a bot of another player. The request may be received by the game server(s) 126 and the game server(s) 126 may request the profile data for the player from the profile server(s) 116. The profile data may then be received by the game server(s) 126, and the playstyle patterns from the user profile may be used by the game engine 128 to control a bot in the game session of the user.

Communication interface 132 may include one or more components and features for communicating across one or more networks, such as the network(s) 102. The communication interface 132 may be configured to communicate via any number of network(s) 102, described herein. For example, to communicate in the bot training system 100 of FIG. 1, the game server(s) 126 may communicate over a LAN with other game server(s) and/or over the Internet with other game server(s) 126, the profile server(s) 116, and/or the client devices 104.

Figure 2B:
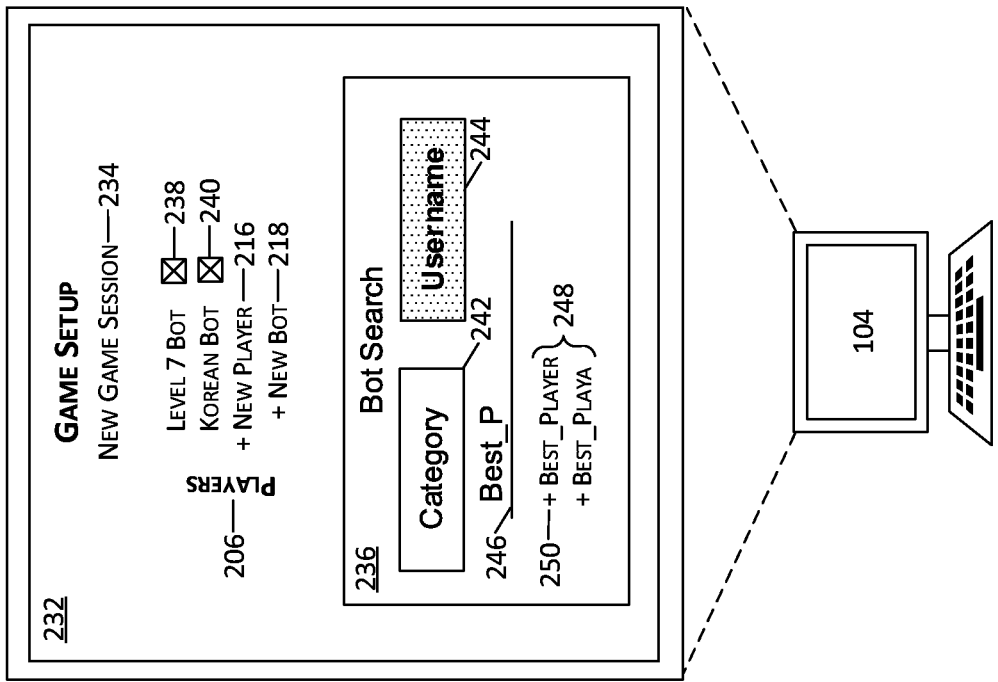
FIG. 2B is another example screenshot from a GUI for creating a new game session, in accordance with some embodiments of the present disclosure.
Figure 2A:
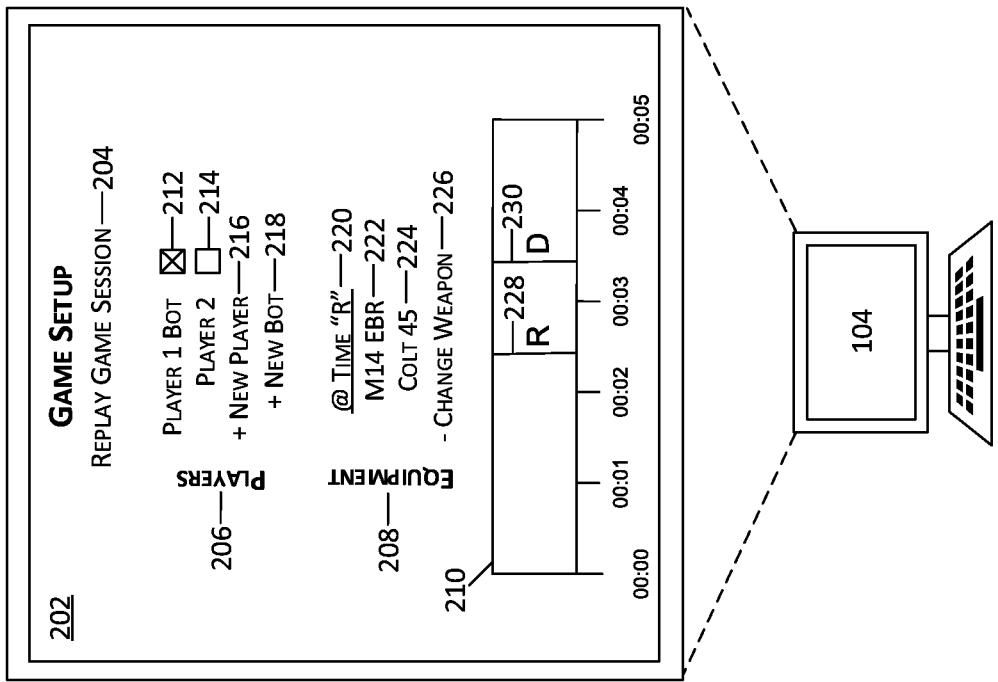
FIG. 2A is an example screenshot from a graphical user interface (GUI) for replaying a game session, in accordance with some embodiments of the present disclosure.

Now referring to FIG. 2A, FIG. 2A is an example screenshot from a graphical user interface (GUI) 202 for replaying a game session, in accordance with some embodiments of the present disclosure. The GUI 202 may be a game setup menu for replaying a game session. In some examples, the GUI 202 may be displayed in response to the player selecting a replay control element, such as the replay control element 204. The GUI 202 may include a players region 206, an equipment region 208, and a timeline control element 210.

The players region 206 of the GUI 202 may enable a user to select which players and/or bots that the user wants to replay the game session against. The user may select the control elements associated with players, or bots representing players, that the user may have previously participated in a game session with, or otherwise have access to. In the screenshot of the GUI 202, the user may have selected the control element 212 to replay the game session against a bot of "Player 1." The user may have elected not to replay the game session against "Player 2," or may not yet have selected the control element 214. The player region 206 also includes the control element 216 for adding new players to the replay of the game session (e.g., in addition to or instead of players that were involved in the original game session) and the control element 218 for adding new bots to the replay of the game session.

For example, the user may have lost a game to "Player 1" and "Player 2." The user may have been eliminated from the game by "Player 1," so the user may want to replay the game session against a bot of at least "Player 1" to learn how the user may have defeated "Player 1." In addition, the user may also want to challenge himself or herself by playing against other players (e.g., by selecting the control element 216) and/or by playing against other bots (e.g., by selecting the control element 218). The new players and/or the new bots may be selected by the user based on the players or bots being of a higher experience level than the user, having beat the user in the past, being well-known in the game community or to the user, and/or for another reason.

The equipment region 208 of the GUI 202 may enable a user to change or swap equipment (e.g., items, weapons, tools, etc.) prior to replaying the game session. For example, the user may first select, using the timeline control element 210, where in the game session to restart from, as indicated by the time indicator 228 with an "R." Once the user sets the time indicator 228, the equipment of the user at the time "R" may be populated in the equipment region 208. A description of the time that the equipment listing refers to is illustrated by the time listing 220. At time "R," the user may have had an M14 EBR, as indicated by the weapon listing 222, and a Colt 45, as indicated by the weapon listing 224. The user may use the control element 226 to change weapons. Changing weapons may include adding new weapons, removing weapons, or a combination thereof. Although weapons are illustrated in the screenshot of the GUI 202, this is not intended to be limiting. For example, the equipment may include items, accessories, tools, etc., depending on the game, the game mode, the user's experience level within the game, etc. Additionally or alternatively, the user may similarly adjust equipment of player bots, and/or stats of the player and/or player bots (e.g., health, strength, etc.).

The timeline control element 210 may enable the user to select where in the game the user wants to start the replay from. For example, the timeline may include the time indicator 228 that may be slideable, insertable, selectable, or otherwise capable of manipulation by the user for moving about the timeline to select where to replay the game session from. The time indicator 230 may include a time of interest to the user, such as, for example, the time of death (as indicated by the "D") in the screenshot of the GUI 202. The time of interest is not limited to a time of death and can include a time where the user was eliminated from the game, from prior to another playing of interest being eliminated, from a time before ammunition was depleted, etc. In some examples, the GUI may include a list of options for the user to select from with respect to determining the time of interest to the user. The list of options may be a standard or default set of options (e.g., time of elimination, time of elimination of one or more other players, time of capturing a flag, time a new item or weapon was picked up, etc.), and/or the list of options may be based on a single game session, such as by analyzing the game session data of a single game session and identifying times of interest within the game.

Further, in some examples, a user (and/or another user, such as a spectator) may provide user input during a game session or a reply of a game session to bookmark, snapshot, flag, or otherwise indicate times of interest. For example, a user may provide a defined user input (e.g., key command) to indicate a time of interest. The time of interest may be automatically determined and may correspond to a time the defined user input is received. For example, the time of interest may be approximately the time the defined user input is received, and/or may be a different time derived therefrom. As an example, a user may provide the input after a skirmish to bookmark a time prior to the skirmish (e.g., automatically determined by the system). As another example, prior to engaging an opponent, the user may provide the input to bookmark a time prior to the skirmish. For certain applications, a specific sequence or snippet of a game session that was determined (e.g., heuristically by the game engine) as pivotal or otherwise notable can be preselected, captured, and tagged by the game server or game engine as a highlight, and made available for viewing by one or more participants (or other viewers) of the game session. In one or more further examples, a user may be able to replay the highlight sequence with bots representing the other players participating in the game session. In one or more examples, the bots may be personalized to play similarly to how the other players in the game session play—either from observations of the players during the game session itself, and/or generated from profiles of the other players.

Now referring to FIG. 2B, FIG. 2B is another example screenshot from a graphical user interface (GUI) 232 for creating a new game session, in accordance with some embodiments of the present disclosure. The GUI 232 may be a game setup menu for creating a new game session. In some examples, the GUI 232 may be displayed in response to the player selecting a new game control element, such as the new game control element 234. The GUI 232 may include a players region 206, an equipment region 208 (not shown), and a search platform 236.

Similar to the GUI 202, the players region 206 of the GUI 202 may enable a user to select which players and/or bots that the user wants to play a game session against. The user may select the control elements associated with players, or bots representing players, that the user wants to participate in a game session with. In the screenshot of the GUI 232, the user may have selected the control element 238 to play the game session against a bot of "Experience Level 7" (e.g., a bot having an aggregate playstyle that is generated based on users of experience level 7). The user may also have selected the control element 240 to play the game session against a "Korean" bot (e.g., a bot having an aggregate playstyle that is generated based on users from Korea). The player region 206 also includes the control element 216 for adding new players to play the game session against and the control element 218 for adding new bots to play the game session against.

In the screenshot of the GUI 232, a user may have selected the control element 218 for adding a new bot. The user may then be able to use the search platform 236 to search for a bot to play against. In some examples, the search platform 236 is displayed in the GUI 232 in response to the user selecting the control element 216 and/or the control element 218. In other examples, the search platform 236 may always be visible in the GUI 232. Although not illustrated, a similar search platform 236 may be used when the user selects the control element 216 for adding a new player.

The search platform 236 for adding a new bot may enable searching for bots based on category (e.g., by selecting the control element 242), by username (e.g., by selecting the control element 244), by actual name, and/or by other criteria. For example, selecting the control element 242 may allow the user to search for a bot from a category (e.g., experience level 7, experience level 9, Korean, German, etc.). In the screenshot of the GUI 232, the user may have selected the control element 244 (e.g., as indicated by the shading of the control element 244 in FIG. 2B). The user may then search for a specific username by typing the username (or a portion thereof) into the query region 246. In the example of FIG. 2B, the user may begin typing a username "Best_Pl . . . " and results may populate in the results region 248. In this example, if the user were to select the control element 250, the bot associated with the username "Best_Player" may be added to the players in the player region 206. As such, when the user enters the game session, a bot associated with the username "Best_Player" will be instantiated in the game and controlled according to playstyle patterns from a user profile associated with the user having the username "Best_Player."

User Profile Generation

One aspect of the present disclosure includes generating user profiles to capture playstyle patterns that may be used to control an instantiation of a bot (e.g., a virtual representation of a user) within a game session. The user profile generation may be described herein with respect to the bot training system 100 of FIG. 1; however, this is not intended to be limiting. For example, the user profiles may be generated in systems that include different components or features than the bot training system 100, additional components or features than the bot training system 100, or a combination thereof.

To generate a user profile for a user, game session data (e.g., metadata) from one or more game sessions of a game participated in by the user may be analyzed. For example, for a first person shooter (FPS) type game, such as the FPS illustrated in the screenshots of the game sessions 114, the game session data may include one or more of: the game state data from each of the game sessions 114, the player data from each of the game sessions 114, the environment data from each of the game sessions 114, the image data from each of the game sessions 114, the player perspective data from each of the game sessions 114, the input data from each of the game sessions 114, and/or other data from each of the game sessions 114. In one or more examples, game session data may be derived from a game API and/or include image and/or audio data from a game session 114 and player data (e.g., user input data) from the same game session 114.

As described herein, the user profiles may include playstyle patterns for different genres of games, different games, different game modes within games, different playstyle characteristics (e.g., aggressive, cautious, etc.) within different game modes within games, different levels, different levels and different game modes of the game, and/or playstyle patterns for other granularities. As such, when generating a playstyle pattern for a particular game mode of a game, for example, the game session data used for generating the playstyle patterns may be collected from game sessions that match that particular game mode. In some examples, other game session data (e.g., from other game modes of the game, from the genre of games, etc.) may also be used to generate the playstyle patterns for the game mode of the game. In such examples, playstyle patterns of the user that are specific to the game mode of the game may be supplemented with general playstyle patterns of the user for the game (e.g., the user may play more aggressively in capture the flag, but the user may almost always use a sniper rifle, no matter the game mode).

In some examples, such as when using all of the game session data may be unnecessary and/or to reduce computing and processing requirements while achieving similar results, a subset of the game session data that is associated with the user may be determined. For example, in a game session with more than one user, all of the game session data from the game session may not be relevant to the user, and specifically may not be relevant to learning playstyle patterns of the user. As such, the game session data that is associated with the user may be determined, and this game session data may be the game session data used by the profile server(s) 116 when generating the user profile for the user. In some cases, this data may include or be based on the player perspective data, which may capture information about what is viewable, or has been viewable or knowable to the user. The player perspective data may include or be derived any combination of game session data, such as environment data, image data, and/or game state data.

To determine the game session data associated with the user, portions of the game session data that are associated with users other than the user associated with the user profile generation may be filtered out. For example, if each user has respective image data, only the image data of the user associated with the user profile generation may be used, and the other image data may be filtered out. As another example, the game state data that is associated with other users but does not have an impact on the user associated with the user profile generation may be filtered out. A further example may include filtering out player data associated with the other users, or at least a portion of the player data (e.g., filtering out the player data associated with weapons that are unlocked for another user, but that were not available or knowable to the user in the game session(s)).

The game session data may be applied to one or more machine learning models (e.g., by the training module 118). For example, the machine learning models (e.g., neural networks) may be trained by applying the game session data to the machine learning models as inputs, which the machine learning models process to generate outputs. The outputs may include playstyle patterns of the user or, more specifically, learned preferences, controls, and/or actions of the user for any of a variety of different circumstances, frames, or variables within the game.

The playstyle patterns, with respect to an FPS type game, may include the equipment most commonly used by the user, such as the weapons, items, accessories, etc., and also when or how the user most commonly uses those weapons, items, accessories, etc. (e.g., subjective trigger information). For example, with reference to the screenshot of the game session 114(A), the neural network(s) may learn that the player 150 generally carries an assault rifle and a sniper rifle when playing in a particular game, a particular game mode, a particular level, etc. In addition, the neural network(s) may learn which of the weapons the player equips in certain environments. For example, when in the vicinity of buildings (e.g., the building 146), the user may be more likely to equip the assault rifle, but when in an open field, the player 150 may equip the sniper rifle. In addition, the neural network(s) may learn that the player 150 generally carries an incendiary grenade and a smoke grenade, but when in open environments, the incendiary grenade is more likely to be equipped, while in close quarters, the smoke grenade is more likely to be equipped. Other behaviors within the same context may include particular tactics. For example, a user may typically perform flanking or strafing maneuvers in a particular direction, or may tend to seek a particular position or advantage (e.g., high ground, shelter, obfuscation) before attacking. Other tactics may include, without limitation, aiming for particular areas. For example, a user with above-average accuracy may try to target critical and/or unprotected regions (e.g., heads) of opponents, whereas a user with less confidence in their timing or accuracy may tend to target larger regions (e.g., torso), or to immobilize (e.g., by targeting the legs or other ambulatory mechanisms) potential targets before moving on to critical areas.

The playstyle patterns may further include the actions or commands of the user (e.g., user inputs as represented by the user input data) in view of a variety of different environmental characteristics, game status information, and/or other variables of the game. In other words, the playstyle patterns may be learned actions or commands of the user in view of some or all of the information available to the user when performing those commands or actions. For example, with reference to the game session 114(A), the playstyle patterns may include whether the user walks, runs, crawls, sits, lays down, jumps, hides behind an object, enters a door, opens a door, closes a door, searches a closet, shoots a weapon, throws a grenade, uses an item, etc. in view of the different environmental characteristics, game status information, and/or other variables of the game (and frequencies or patterns thereof). Additional examples include learned physical attributes of the user for any combination of the actions or commands (or button presses and/or combinations thereof). For example, the physical attributes may capture the user's reaction time, button press time, scroll speeds, analog input patterns (e.g., the force and/or speed of input to an analog control), etc., which may in some cases be learned for various contexts, or may be general for the user.

The environmental characteristics may include the characteristics of the environment that a character or avatar of a user is exposed to at any point in time. For example, an environmental characteristic may include a building, a wall inside the building, a door inside the building or outside the building, a rock, a tree, a static vehicle, a controllable vehicle, a box, a crate, a tunnel, a dark tunnel, a light room, a cave, another player or bot, a fire, a weapon or ammunition in the environment, items or accessories in the environment, etc.

The game status information may include the amount of time left in the game, the amount of players alive, the amount of players eliminated, the players that are left (e.g., their experience levels, their teams, etc.), the players locations in the environment (e.g., are they close to the user, far away, in the field of view of the user, etc.), statistics of other players and the user (e.g., health, ammunition remaining, weapon types, etc.), whether certain goals have been achieved (e.g., whether the flag has been captured, how many times the flag has been captured, etc.), closeness to a game ending goal (e.g., a certain number of kills in team death match, a certain number of flags captured in capture the flag, a certain number of building invaded, etc.), and/or other game status information. In other words, the game status information may include the information about the user and the other players or bots that may be known to the user during the game session (e.g., the amount of hit points for a particular player to die may not be known to the user, but a general health level, as indicated by a health indicator, may be known to the user).

Other variables may include information about leveling in the game, such as how close the user is to a next experience level, or how close the user is to a certain statistic, such as a certain kill/death ratio. For example, a user may have different playstyle patterns when the user is close to leveling up (e.g., the user may try to gain more points more quickly, by being more aggressive, or by participating in tangential tasks, such as finding items that lead to more points, etc.).

The playstyle patterns may be learned by the machine learning models such that a bot (or virtual representation of a user) can be controlled according to the playstyle patterns. In some examples, the game session data may be applied to a single machine learning model. In other examples, different types of the game session data may be input into different machine learning models to learn the playstyle patterns of the user. For example, if the machine learning models included neural networks, a first neural network (e.g., a convolutional neural network, a recurrent convolutional neural network) may use the user input data and image data as an input to learn an association between the inputs of the user in view of what the user sees in the virtual environment. For example, the first neural network may map the behavior of the user by identifying changes in the image data in view of the user input data (e.g., using inverse reinforcement learning or classification algorithms). A second neural network (e.g., an auto-encoder neural network, recurrent neural network, convolutional neural network, etc.) may use the game state data and the user input data to learn the types of inputs of the user in view of a different game information (e.g., where other players are with respect to the user, the proximity of bullets or explosions to the user, etc.). In such an example, the outputs of the first neural network and the second network may both be applied to a third neural network (e.g., convolutional neural network, auto-encoder neural network) that learns a correlation between user inputs and both the game state data as well as the image data.

In some examples, the game session data may be input to a different machine learning model(s) for learning different control types or action types. For example, first machine learning model(s) may be used to learn when a player uses movement controls or performs movement actions. The first machine learning model(s) may output simulated controls (or user inputs) to a control pad (e.g., the control pad 154) for moving about an environment and/or may output movement directions as actions. In such an example, second machine learning model(s) may be used to learn when a player uses a weapon and/or an item or accessory (or separate machine learning model(s) may be used for weapons, items, and/or accessories). The second machine learning model(s) may output simulated controls to a weapon firing button (e.g., the trigger control element 160) and/or may output trigger pulls as actions. Additional or alternative machine learning model(s) may be used for stance (e.g., crouch, lay prone, stand up, etc.), speed of movement (e.g., run, walk, crawl, etc.), and/or other control and/or actions in the game (e.g., for physical attributes).

In other examples, different game session data may be used as input data for different streams of a single machine learning model. In such an example, the streams may all be combined at a layer(s) of the machine learning model (e.g., the streams may be combined at a fusion layer or at a fully connected layer of a convolutional neural network). For example, outputs of different convolutional streams may be used as inputs to a fully connected layer of a convolutional neural network and/or may be combined or otherwise go through additional layers prior to being input to the fully connected layer. As another example, outputs from a first stream of a first neural network type and a second stream of a second neural network type may be used as inputs to a fully connected layer of a neural network and/or may be combined or otherwise go through additional layers prior to being input to the fully connected layer.

These examples are not intended to be limiting, any type or number of machine learning models may be used to learn playstyle patterns of the user.

The playstyle patterns of the user may then be associated with a user profile of the user in the profile manager 120. For example, the profile manager 120 may store basic information of the user (e.g., name, username, games the user plays, etc.), as well as the playstyle patterns of the user. The playstyle patterns, as described herein, may be associated with different game genres, different games, different game modes within the games, and/or at other levels of granularity. The user profile may be represented by profile data, and data representing the playstyle patterns may be included in the profile data.

Once a user profile is created for a user to include playstyle patterns of the user, the playstyle patterns (e.g., the profile data representing the playstyle patterns) may be used by the game server(s) 126 when hosting a game session. For example, a user may request (e.g., via one of the client devices 104) to play a game session (e.g., a new game session, a replay of another game session, etc.) against a bot of a particular player. In some examples, a user may publish or otherwise make accessible a bot generated from one or more of the user's previously played game sessions for other users to play with or against. The game server(s) 126 may then obtain (e.g., retrieve from data store(s) 134, receive from the profile server(s) 116, etc.) the profile data of the user, or at least the profile data associated with the playstyle patterns of the user. In examples where the request is for a particular game mode, or a particular level in the game, etc., the game server(s) 126 may only obtain and/or use the playstyle patterns for the player that correspond to the particular game mode, particular level, etc. In some examples, the bot manager 130 of the game engine 128 may use the playstyle patterns (e.g., the data representative thereof) to generate and/or instantiate a bot (e.g., a virtual representation of the player requested by the user) in a game session of the game.

If a request is received to play against a bot of a particular player, and that player does not have a corresponding user profile (or data thereof that satisfies settings for the new game session), a user profile corresponding to another player may be selected. In some instances, this may be a result of the particular player not opting into the user profile generation feature (e.g., the player may not have opted in to have a user profile created that includes playstyle patterns of the user generated from information tracked over various game sessions of a game or games). As another example, the system may not yet have sufficient game session data to reliably determine accurate playstyle patterns for the user. It is noted that in cases where there is insufficient game session data to reliably determine accurate playstyle patterns for the user, in some examples, game session data of one or more other users may be used to supplement the user's game session data, such as based on similarities between those other users and the user (e.g., similar to user category profile generation). This may be used to address potential problems related to sparse data sets.

To find an appropriate user profile, in some examples, characteristics of playstyles of the particular player may be determined from only one game session (but in some examples, more game sessions may be available), such as a game session participated in by both the user making the request and the player. For example, the game session data (e.g., the game session data that is available to the bot training system 100 that does not affect the opt-out of the player) from the game sessions may be used to determine some characteristics of the player related to the playstyle patterns of the player. Weapons, items, accessories, aggressiveness, jump frequency, run frequency, crouch frequency, etc. may all be determined at a more basic level (e.g., not learned from a multitude of game sessions, but only gleaned from one game session). In some examples, the game session data may be applied to a machine learning model(s) trained to identify the characteristics of the playstyle patterns of the player. In any example, the characteristics may be compared against characteristics of user profiles corresponding to other players. The comparison may be for other players who have user profiles with playstyle patterns for the particular game, game mode, level, etc. Once a similarity threshold is met with respect to at least one of the user profiles corresponding to the other players, one of the user profiles may be selected as the user profile for the player. As a result, even though the playstyle patterns used to control the bot of the player may not be learned from game sessions of the player, the playstyle patterns may at least more closely resemble those of the player than a conventional bot (e.g., a bot that is not controlled according to playstyle patterns learned from a user).

To find an appropriate user profile, in other examples, player data of the player may be determined, such as the experience level of the player in the game, the geographic location of the player (e.g., based on an IP address of the player, based on location data input by the user, etc.), and/or other player data. In such examples, a user category profile (explained in more detail herein) may be loaded that has a threshold similarity to the player data of the player. For example, if the player were an experience level 7 player and was from California, the profile server(s) 116 (e.g., the profile manager 120) may identify a user category profile that is representative of an experience level 7 player and/or a player from California or the surrounding Western contiguous United States. The user category profile may also be tailored to a specific game, game mode in the game, level in the game, etc.

In any example, once a user profile or user category profile is determined for a player, the bot manager 130 may instantiate a bot in a game session, and may control the bot according to the playstyle patterns from the user profile or the user category profile(s). In some examples, a bot in a game, as managed by the game engine 128, may be controlled using a finite number of parameters (e.g., an aggressiveness score, an attack score, a speed score, a strength score, a defense score, an accuracy score, etc.), and once the parameters are set, the bot may behave a certain way (e.g., until the parameters are changed, or they may remain unchanged throughout the game session). In such examples, the playstyle patterns from the user profile may be used to set the parameters of the instantiation of the bot. For example, if the playstyle patterns indicate that the player is more cautious (e.g., hides behind objects, crouches often, crawls often, uses a silencer, etc.), parameters of the bot may be set to a more cautious setting (e.g., the aggressiveness score may be less, the attack score may be less, etc.). Once the parameters are set, the programming of the bot may be adjusted such that the bot is controlled according to the playstyle patterns of the player.

In some examples, a machine learning model(s) may be trained to learn associations between playstyle patterns of players and parameters of bots. In such examples, the profile data, or at least the portion of the profile data corresponding to the playstyle patterns of the user, may be input into a machine learning model(s) and the machine learning model(s) may learn the associations between the playstyle patterns and the parameters of the bots. In some examples, this may be accomplished using machine learning model(s) trained using supervised learning (e.g., support vector machines, linear regression analysis, decision trees, naive Bayes, perceptron neural networks, adaptive linear neuron neural networks, etc.). In other examples, this may be accomplished using machine learning model(s) trained using unsupervised learning (e.g., auto-encoder neural networks). The trained (e.g., deployed) machine learning model(s) may then be used by the profile manager 120 and/or the bot manager 130 to input the profile data corresponding to the playstyle patterns of the user into the deployed machine learning model(s) and to update the parameters of the bots using the outputs of the machine learning model(s).

In some examples, a bot in a game may be controlled using one or more machine learning models (e.g. neural networks such as convolutional neural networks, auto-encoder neural networks, etc.). For example, the machine learning model(s) may be trained, based on the playstyle patterns of a player, to use in-game game session data as an input, and output controls or actions to control an instantiation of a bot in the game session (which may correspond to simulated user inputs from that player). In some examples, the machine learning model(s) may be the machine learning model(s) from the user profile that learned the playstyle patterns of the user. For example, the game session data may be input to the machine learning model(s) so that the machine learning model(s) can learn the playstyle patterns of the users (and/or the aggregate playstyle patterns of the user categories). Once the machine learning model(s) are fully trained (e.g., demonstrate acceptable performance), the machine learning model(s) may be deployed such that the machine learning model(s) can be used by the game server(s) 126 in generating the instantiations of the bots in game sessions. As such, once the machine learning model(s) are deployed, in-game game session data may be applied to the machine learning model(s), and the machine learning model(s) may output the commands and/or actions for controlling the bots. In such examples, the deployed machine learning model(s) may be updated for the users as the users associated with the user profiles continue to play in new game sessions in order to keep the machine learning model(s) up to date with respect to the playstyle patterns of the users (or aggregate playstyle patterns of the user category).

In other examples, the machine learning model(s) may be different machine learning model(s) than those associated with the user profile, and may have been trained concurrently or at a different time than the machine learning model(s) associated with the user profile. For example, the machine learning model(s) that learn the playstyle patterns of the user may be implemented by the profile server(s) 116 (e.g., by the training module 118), and the machine learning model(s) that control the bot may be implemented by the game server(s) 126 (e.g., by the bot manager 130). In other examples, both machine learning model(s) may be implemented by either the profile server(s) 116 or the game server(s) 126. In any of the described examples, different versions of the user profiles could be captured over time, and may be associated with a particular time, time period, and/or game session. For example, over time the playstyle patterns of a user may change, and a user may in the future play a historical version of another player, such as a version of the player at the time of a replay, and/or a version specified by the user. According to one or more examples, a bot may be generated using any single (or selected subset of) version(s) of the user profile.

The in-game (e.g., real-time or near real-time) game session data may be input into the machine learning model(s) for controlling the bot, and the bot may be controlled using the outputs of the machine learning model(s). For example, the in-game game session data may include the game state data, the player data, the environment data, the user input data, the image data, and/or other data, and the in-game game session data may be applied to the machine learning model(s), and the machine learning model(s) may output simulated controls (e.g., inputs to a control pad, inputs to a keyboard, inputs to a joystick, inputs to a touch-screen selecting a reload button or a fire button, etc.), may output specific actions that result from controls (e.g., fire weapon, move right, jump, jump this high, run, crouch, etc.). In other words, the machine learning model(s) may receive the in-game game session data and, having learned controls and actions of a user from prior game session data of a single or multitude of game sessions, may output controls and/or actions that represent the learned controls and actions of the user. As a result, the bot may be controlled in such a way that more closely represents the player associated with the user profile than a conventional bot.

Figure 3:
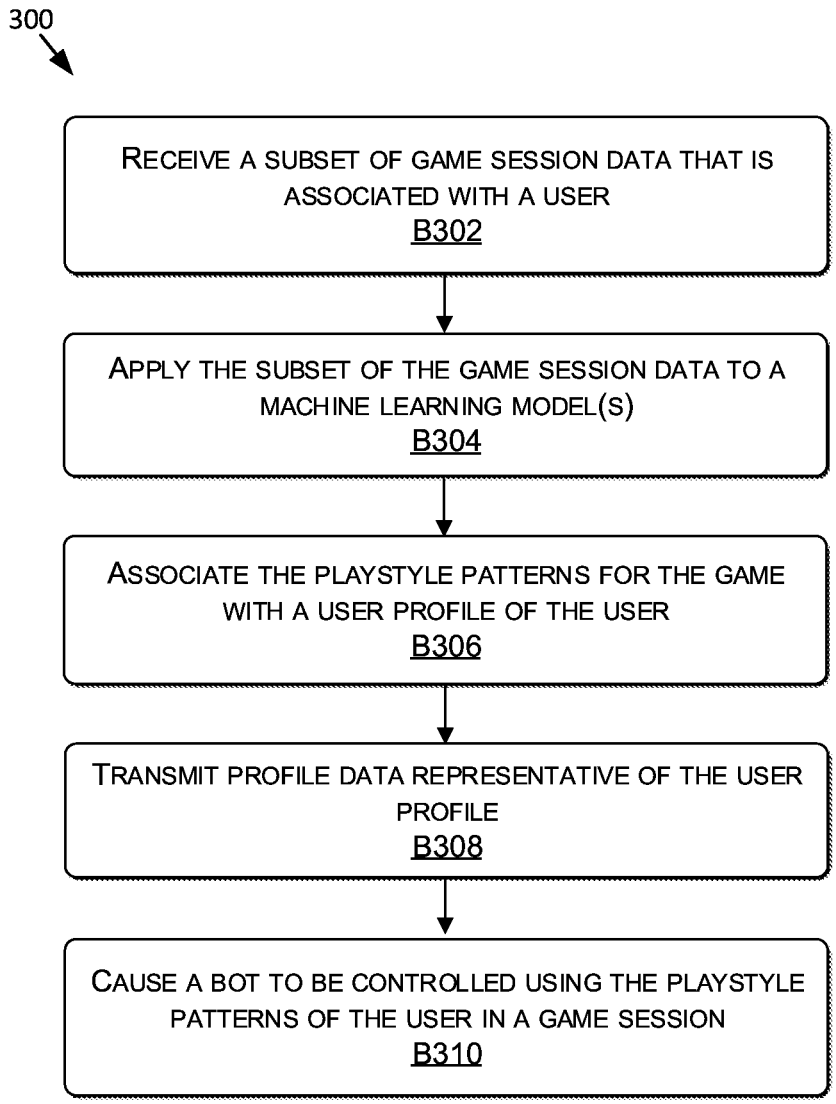
FIG. 3 is a flow diagram showing a method for generating a user profile, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 300 is described, by way of example, with respect to the bot training system 100 (FIG. 1). However, these methods may additionally or alternatively be executed by any one system, or any combination of systems, including, but not limited to, those described herein.

FIG. 3 is a flow diagram showing a method 300 for generating a user profile, in accordance with some embodiments of the present disclosure. The method 300, at block B302, includes receiving a subset of game session data that is associated with a user. For example, the profile server(s) 116 may receive the game session data that is associated with a user (e.g., a user of the client device 104(A)). The game session data may be representative of one or more game sessions participated in by the user, such as the game sessions 114.

The method 300, at block B304, includes applying the subset of the game session data to a machine learning model(s). For example, the training module 118 of the profile server(s) 116 may apply the game session data associated with the user to one or more machine learning models. The machine learning model(s) may learn the playstyle patterns of the user for the game (e.g., for the game, for a game mode of the game, for a level of the game, etc.). The playstyle patterns may be learned based at least in part on user inputs (e.g., as represented by the user input data) in view of game variables with game sessions of the game, as described herein.

The method 300, at block B306, includes associating the playstyle patterns for the game with a user profile of the user. For example, profile manager 120 of the profile server(s) 116 may associate the playstyle patterns for the game with a user profile of the user.

The method 300, at block B308, includes transmitting profile data representative of the user profile. For example, the communication interface 122 of the profile server(s) 116 may transmit profile data (e.g., the profile data associated with the playstyle patterns of the user). The profile data may be transmitted to the game server(s) 126, such as to the bot manager 130 of the game server(s) 126.

The method 300, at block B310, includes causing a bot to be controlled using the playstyle patterns of the user in a game session. For example, the profile data may be used to cause a bot to be controlled using (e.g., according to) to the playstyle patterns of the user in a game session. In some examples, the transmitting of the profile data may cause the bot to be controlled in a game session upon receipt of the profile data by the game server(s) 126 (e.g., the profile data may be transmitted at the beginning of and/or during a game session including the bot). In other examples, the profile data may cause the bot to be controlled in a game session after receipt of the profile data by the game server(s) 126. For example, during a new game session (or replayed game session) setup, the game server(s) 126 may obtain the profile data (e.g., request and receive from the profile server(s) 116) in response to receiving a request by a user (e.g., the user of the client device 104(A)) to play against a bot of a player associated with the user profile. The profile data may be stored in a cache, for example, or otherwise stored in the data store(s) 134 of the game server(s) 126. The bot manager 130 may generate an instantiation of the bot using the profile data such that when the new game session (or replayed game session) begins, the bot is included in the game session and controlled according to the playstyle patterns represented by the profile data (e.g., by setting parameters of a bot according to the playstyle patterns or inputting the in-game game session data into a machine learning model(s) that outputs learned controls and/or actions according to the playstyle patterns).

User Category Profile Generation

Another aspect of the present disclosure includes generating user category profiles to include aggregate playstyle patterns of a category of users that may be used to control an instantiation of a bot (e.g., a virtual representation of users in the category) within a game session. Although the user category profile generation may be described herein with respect to the bot training system 100 of FIG. 1, this is not intended to be limiting. For example, the user category profiles may be generated in systems that include different components or features than the bot training system 100, additional components or features than the bot training system 100, or a combination thereof.

A user category may include, without limitation, users of a particular experience or measured skill level (e.g., experience level 7, experience level 9, master level, novice level, championship level, etc.), users of a particular age (e.g., age groups, age ranges, etc.), users from a particular geographic area (e.g., a city, state, region, country, etc.), users of a particular console or platform, users associated with a particular rank or range or ranks (e.g., regional ranks, national ranks, world-wide ranks, etc.), and/or other types of users.

A determination may be made as to what categories bots should be created for based on a variety of factors. In some examples, the determination may made by a game developer or by another entity, such as the entity who controls the profile server(s) 116. In such examples, categories may be selected based on choice, popularity, default categories, or easily delineated category groupings (e.g., experience level in the game, national ranks, age groups, etc.). In other examples, the categories may be determined based on user requests. For example, users may request to play against bots of certain categories, and a certain number of requests for a certain category of bot may result in the creation of a bot for that category.

To generate a user category profile for a category of users, game session data from numerous game sessions of a game participated in by the users of the category may be analyzed. For example, for a first person shooter (FPS) type game, such as the FPS illustrated in the screenshots of the game sessions 114, the game session data may include the game state data from each of the game sessions 114 as well as game sessions participated in by other users of the category (e.g., other users of the client devices 104), the player data from each of the game sessions 114 as well as game sessions participated in by other users of the category, the environment data from each of the game sessions 114 as well as game sessions participated in by other users of the category, the image data from each of the game sessions 114 as well as game sessions participated in by other users of the category, the input data from each of the game sessions 114 as well as game sessions participated in by other users of the category, and/or other data from each of the game sessions 114 as well as game sessions participated in by other users of the category.

Similar to the user profiles, the user category profiles may include aggregate playstyle patterns for different genres of games, different games, different game modes within games, different playstyle characteristics (e.g., aggressive, cautious, etc.) within different game modes within games, different levels, different levels and different game modes of the game, and/or aggregate playstyle patterns for other granularities. As such, when generating aggregate playstyle patterns for a game mode of a game, for example, the game session data used for generating the aggregate playstyle patterns may be from game sessions of the game mode of the game.

In some examples, such as when using all of the game session data may be unnecessary, a subset of the game session data that is associated with the users of the category may be determined. For example, in a game session with more than one user, all of the game session data from the game session may not be relevant to the users of the category, and specifically may not be relevant to learning aggregate playstyle patterns of the users of the category. As such, the game session data that is associated with the users of the category may be determined, and this game session data may be the game session data used by the profile server(s) 116 when generating the user category profiles.

To determine the game session data associated with the users of the category, portions of the game session data that are associated with users not included in the category may be filtered out. For example, if each user has respective image data, only the image data of the user of the category may be used, and the other image data may be filtered out. As another example, the game state data that is associated with users that are not in the category and that does not have an impact on the users of the category may be filtered out. A further example may include filtering out player data associated with the users who are not included in the category, or at least a portion of the player data, as described herein.

The game session data may be applied to one or more machine learning models (e.g., by the training module 118). For example, the machine learning models (e.g., neural networks) may be trained by applying the game session data to the machine learning models as inputs. The machine learning models may take the game session data as inputs and generate outputs. The outputs may include the aggregate playstyle patterns of the users of the category or, more specifically, learned preferences, controls, and/or actions of the users of the category for any of a variety of different circumstances or variables within the game.

Once the game session data is determined, the application of the game session data to the machine learning model(s), the generation of the user category profiles, and the control of the bots may be similar to the application of the game session data to the machine learning model(s), the generation of the user profiles, and the control of the bots, respectively, as described above with respect to user profile generation. For example, the user category profiles may include aggregate playstyle patterns of the users of the category, and the aggregate playstyle patterns may be used to control an instantiation of a bot.

Figure 4:
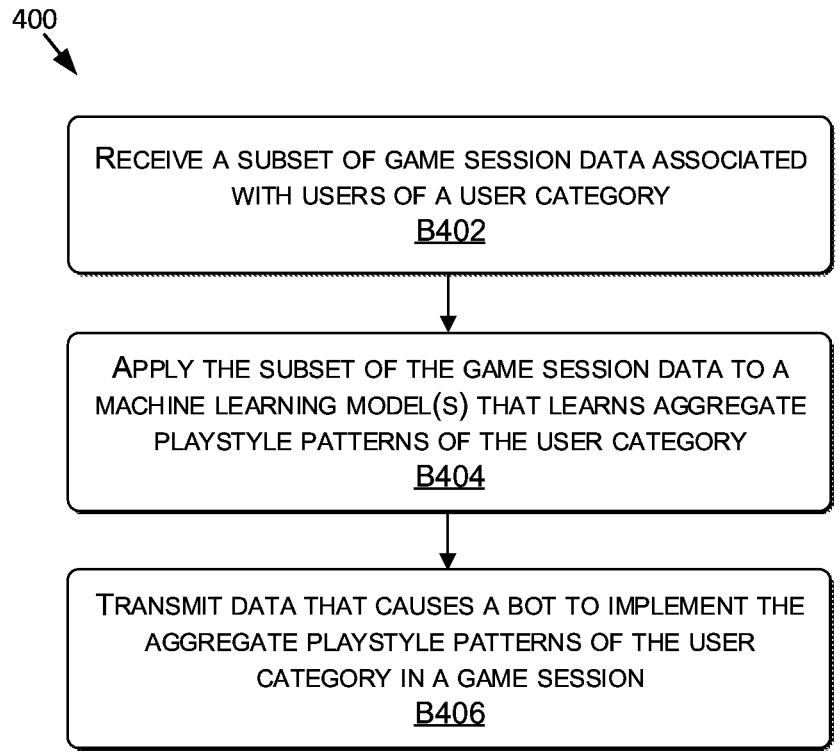
FIG. 4 is a flow diagram showing a method for generating a user profile associated with a user category, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the bot training system 100 (FIG.

1). However, these methods may additionally or alternatively be executed by any one system, or any combination of systems, including, but not limited to, those described herein.

FIG. 4 is a flow diagram showing a method 400 for generating a user profile associated with a user category, in accordance with some embodiments of the present disclosure. The method 400, at block B402, includes receiving a subset of game session data associated with users of a user category. For example, the profile server(s) 116 may receive the game session data that is associated with users of the user category (e.g., a user of the client device 104(A), a user of the client device 104(B), a user of the client device 104(C), etc.). The game session data may be representative of one or more game sessions participated in by the users from the user category, such as the game sessions 114 with respect to the user of the client device 104(A).

The method 400, at block B404, includes applying the subset of the game session data to a machine learning mode(s) that learns aggregate playstyle patters of the user category. For example, the training module 118 of the profile server(s) 116 may apply the game session data associated with the users of the user category to one or more machine learning models that learn aggregate playstyle patterns of the user category. The machine learning model(s) may learn the aggregate playstyle patterns of the users of the user category for the game (e.g., for the game, for a game mode of the game, for a level of the game, etc.). The aggregate playstyle patterns may be learned based at least in part on user inputs (e.g., as represented by the user input data of users of the category) in view of game variables with game sessions of the game, as described herein.

The method 400, at block B406, includes transmitting data that causes a bot to implement the aggregate playstyle patterns of the user category in a game session. For example, the communication interface 122 of the profile server(s) 116 may transmit profile data (e.g., the profile data associated with the aggregate playstyle patterns of the users of the user category) to the bot manager 130 of the game server(s) 126, where the profile data causes a bot to implement the aggregate playstyle patterns of the user category in a game session. The profile data may be used to cause a bot to be controlled using (e.g., according to) to the playstyle patterns of the users of the user category in a game session, similar to block B306 of the method 300, described above.

New or Replayed Game Sessions

A further aspect of the present disclosure includes creating new and/or replayed game sessions that include at least one bot. Although the creation of new and/or replayed game sessions may be described herein with respect to the bot training system 100 of FIG. 1 and the GUIs of FIGS. 2A-2B, this is not intended to be limiting. For example, the user category profiles may be generated in systems that include different components or features than the bot training system 100 and/or the GUIs of FIGS. 2A-2B, additional components or features than the bot training system 100 and/or the GUIs of FIGS. 2A-2B, or a combination thereof.

For a new game session, the game server(s) 126 may receive a request from one of the client devices 104 for starting a new game session (e.g., based on an input to the new game control element 234 of FIG. 2B). During setup of the new game session, the user may search for and/or select bots or players to play against (as described herein at least with respect to FIG. 2B). In some examples, bots and/or players may be auto-populated for inclusion in the game session in addition to or alternatively from the player searching for and/or selecting bots or players.

For example, the user may desire to play against other players, bots representative of players, or bots representative of categories of players that are of interest to the user. The user may desire to play against certain players to learn how those players play and to compete against those players.

The user may desire to play against bots representative of players to practice against the players without actually playing against the players, or because the players may not currently be available to play. For example, the user may have lost to the player in the past, may be playing the player in a future game session, may know that the player is better than the user, higher ranked than the user, or is known to be one of the best players, etc. In addition, by playing against bots that are virtual representations of the player, the user may be able to practice against the players in practice game sessions without affecting the user's statistics (e.g., kill/death, points scored against, etc.). In other words, the user may be able to practice against the players to improve the player's ability to beat the players without the players needing to be active, on-line, and/or available to play.

The user may desire to play against bots representative of user categories in order to practice against categories of players that the user does not often face, or is not able to face based on algorithms of the game for deciding the players and/or bots to include in game sessions. For example, a user from one geographic location may primarily play against players from the same or similar geographic location (e.g., a common occurrence based on game server locations and game lag concerns). As such, a user from the United States may not have a lot of practice against players from Korea, for example, but the user may be playing in a tournament against players from around the world at some point in the future and thus may want to play against a bot controlled according to the aggregate playstyle patterns of players from Korea (e.g., players of a certain experience level from Korea). As another example, a user may not be able to play against players of a certain experience level (e.g., a higher experience level than the user) without also being that experience level. However, the user may want to practice for playing against users of the certain experience level, so a user may request to play against a bot controlled according to the aggregate playstyle patterns of users of the higher experience level.

In some examples, as bots are added to the players region 206 of the GUI 232, the profile data associated with the bot may be requested from and/or received from the profile server(s) 116 by the game server(s) 126. In such examples, the game server(s) 126 may store the profile data (e.g., the profile data representative of the playstyle patterns of the users and/or aggregate playstyle patterns of user categories) prior to the start of the game session. The profile data may be stored in a cache of the data store(s) 134, for example, or in random-access memory for use during the game session. In other examples, the profile data may be requested and/or received at the start of the game session (e.g., during loading of the game session).

During loading of the game session, the bot manager 130 may control the bots (or at least the bots associated with user profiles or user category profiles). In some examples, such as where the bots are controlled by using the playstyle patterns or the aggregate playstyle patterns to set a finite number of parameters of the bots, the bot manager 130 may set the parameters during loading of the game session (in some examples, this may be the only setting of the parameters for the bot) and/or may update the parameters during the game session (e.g., based on the in-game game session data, a change to the parameters may update the bot to play more closely to the playstyle patterns or the aggregate playstyle patterns). In other examples, such as where the bots are controlled by applying in-game game session data to one or more machine learning models, the bot manager 130 may control the bots throughout the game session. In is noted that hybrid approaches are possible.

For a replayed game session, the game server(s) 126 may receive a request from one of the client devices 104 for replaying a previous game session (e.g., based on an input to the replay control element 204 of FIG. 2A). In some examples, the replayed game session may include the immediately preceding game session (e.g., in a post-game session screen of the game, the replay control element 204 may be populated within the GUI 202). In other examples, the replayed game session may include any prior game session. In such an example, the game server(s) 126 may store the game session data for prior games participated in by a user (e.g., all prior games, games played within a period of time, such as the last year, last month, etc., games that the user has tagged for storage, etc.). The user may be able to search, using the game application 106, for the prior game sessions that the user played in (and/or in some examples for games sessions the user did not play in where the user may assume the identity of a different player or be a new player). Each prior game session may be stored with the corresponding game session data from the prior game session (e.g., at least the game session data needed to enable the user to replay the game session). The game session data may include the players and/or bots that participated in the game session.

In some examples, the profile data associated with the players may be retrieved by the game server(s) 126 from the profile server(s) 116 for storage with the game session data. In such examples, bots representative of the players may be instantiated in a replay of the game session without requiring retrieval of the profile data (e.g., at the time that the game session replay is requested by the user). In other examples, the profile data may be requested and/or received once the game session has been selected for replay, upon loading of the replay of the game session, and/or at another time.

During setup of the replayed game session, the user may search for and/or select bots or players to play against (as described herein at least with respect to FIG. 2A). In some examples, bots and/or players may be auto-populated for inclusion in the game session (e.g., the bots and/or players from the game session that is to be replayed may be auto-populated) in addition to or alternatively from the player searching for and/or selecting bots or players (and/or historical versions thereof).

In some examples, the user may want to replay the game session against the same players, or bots representative thereof, from the original game session, and even in one or more examples, before or after a specific point in the game session. For example, a user may have lost in the game session, and may desire to replay the game session—either entirely or from a particular inflection point—to learn what the user could have done differently to cause a different outcome (e.g., winning, lasting longer, etc.). The user may request to play against bots controlled according to the playstyle patterns of the players (e.g., to practice, because the players are not currently available, etc.). In some examples, the user may want to play against some of the players and/or bots representing players from the original game session, but may also want to include other players and/or bots not included in the original game session. For example, the user may want to challenge himself or herself by replacing some of the easier players and/or bots with more difficult players and/or bots during the replay.

The user may also be able to change or swap out equipment, accessories, items, etc. from the original game session in the replay of the game session (e.g., as described herein with respect to FIG. 2A).

The user may select an inflection point in the game session to replay from (e.g., by positioning the replay indicator 228 within the timeline control element 210 of the original game session). As such, when the original game session is reloaded as the replayed game session, the replayed game session will include a substantially equivalent representation of the original game session at the point in time selected. Differences between the replayed game session and the original game session at the point in time of the replay may be the different players and/or bots, the bots representative of players that have replaced the players from the original game session, the different equipment, accessories, items, etc., and/or any changes or updates to the game state as selected by the user (e.g., exploded items no longer exploded, certain portions of a map unlocked that weren't currently unlocked, etc.).

Figure 5:
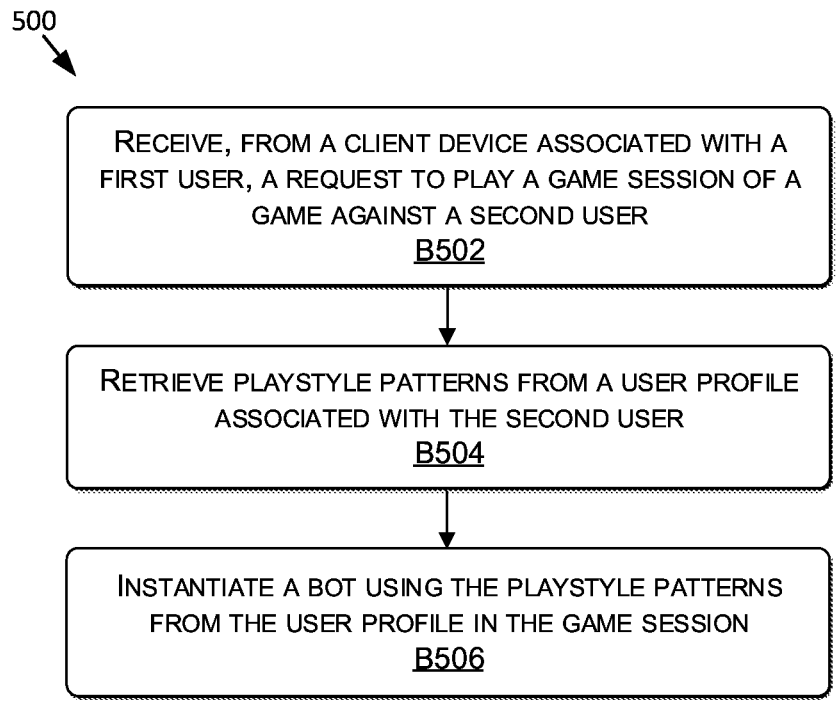
FIG. 5 is a flow diagram showing a method for instantiating a bot using a user profile, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the bot training system 100 (FIG. 1). However, these methods may additionally or alternatively be executed by any one system, or any combination of systems, including, but not limited to, those described herein.

FIG. 5 is a flow diagram showing a method 500 for instantiating a bot using a user profile, in accordance with some embodiments of the present disclosure. The method 500, at block B502, includes receiving, from a client device associated with a first user, a request to play a game session (e.g., a new game session or a replayed game session) of a game against a second user. For example, the game server(s) 126 may receive, from one of the client devices 104, a request to play a game session of a game against a second user. The request may be a request to play against the second user playing as himself or herself, or against a bot representative of the second user. In examples where the request is to play against the user himself or herself, it may be determined (e.g., by the game server(s) 126) that the second user is not available, and thus the determination may be that a bot representative of the second user may be needed in order for the first user to play against the second user.

In some examples, as described herein, the request to play against the second user may be a request to play against a user category.

The method 500, at block B504, includes retrieving playstyle patterns from a user profile associated with the second user. For example, the game server(s) 126 may retrieve (e.g., request and receive) playstyle patterns (e.g., as represented by the profile data) from a user profile associated with the second user.

In the example above, where the request is to play against a second user of a user category, the aggregate playstyle patterns of the user category may be retrieved from the user category profile.

The method 500, at block B506, includes instantiating a bot using the playstyle patterns from the user profile in the game session. For example, the game server(s) 126 (e.g., the bot manager 130 of the game engine 128) may instantiate a bot using the playstyle patterns from the user profile in the game session (e.g., in a replayed game session or in a new game session).

In the example above, where the request is to play against a second user of a user category, the bot may be instantiated using the aggregate playstyle patterns from the user category profile in the game session.

Figure 6:
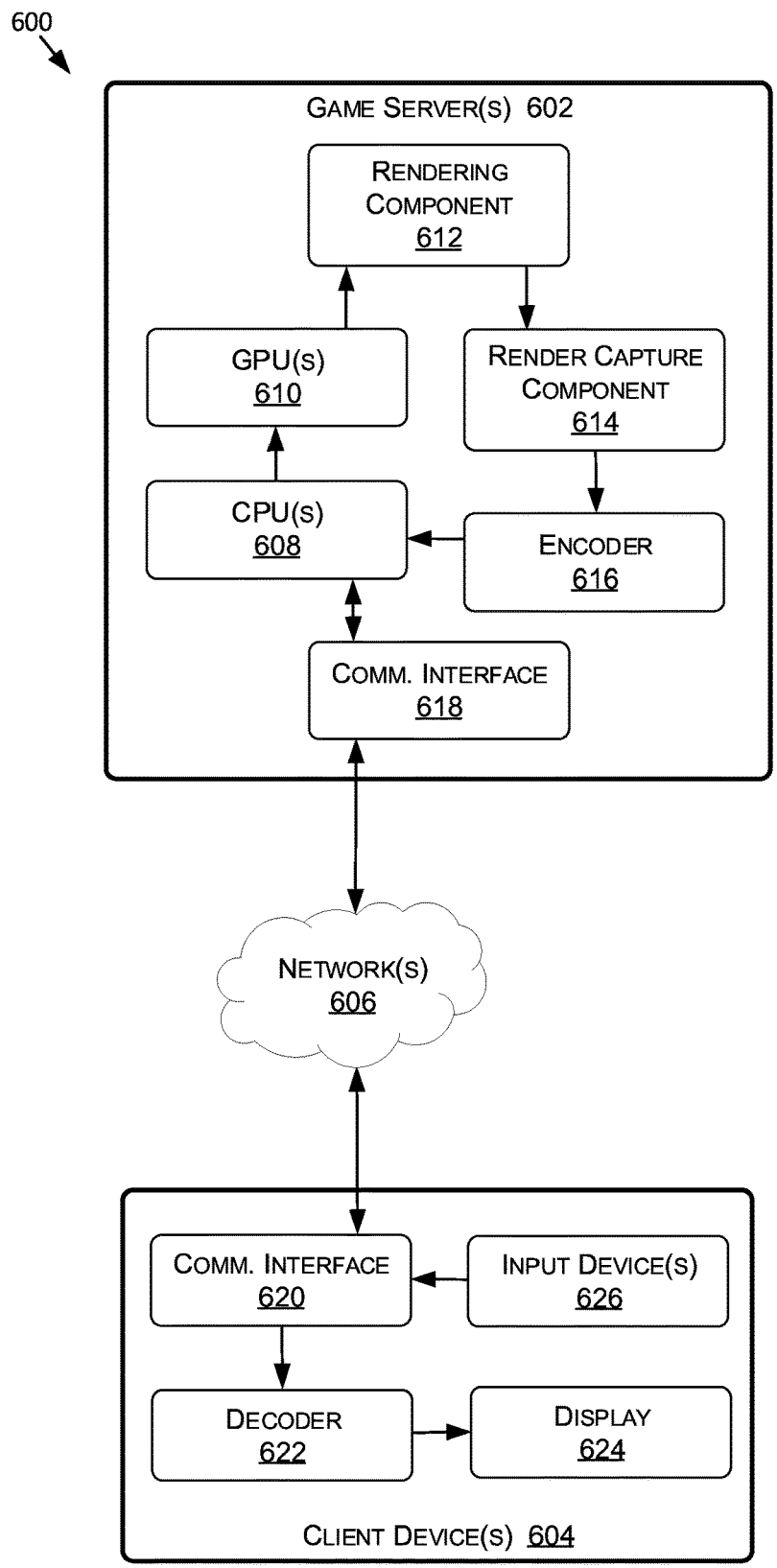
FIG. 6 is an example system diagram for a game streaming system, in accordance with some embodiments of the present disclosure.

Now referring to FIG. 6, FIG. 6 is an example system diagram for a game streaming system 600, in accordance with some embodiments of the present disclosure. FIG. 6 includes game server(s) 602 (which may include similar components, features, and/or functionality to the game server(s) 126 of FIG. 1 and/or the computing device 700 of FIG. 7), client device(s) 604 (which may include similar components, features, and/or functionality to the client devices 104 of FIG. 1 and/or the computing device 700 of FIG. 7), and network(s) 606 (which may be similar to the network(s) 102 of FIG. 1). In some embodiments of the present disclosure, the system 600 may be implemented.

In the system 600, for a game session, the client device(s) 604 may only receive input data in response to inputs to the input device(s), transmit the input data to the game server(s) 602, receive encoded display data from the game server(s) 602, and display the display data on the display 624. As such, the more computationally intense computing and processing is offloaded to the game server(s) 602 (e.g., rendering of the game session is executed by the GPU(s) of the game server(s) 602). In other words, the game session is streamed to the client device(s) 604 from the game server(s) 602, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 602. The client device 604 may receive an input to one of the input device(s) and generate input data in response. The client device 604 may transmit the input data to the game server(s) 602 via the communication interface 620 and over the network(s) 606 (e.g., the Internet), and the game server(s) 602 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include one or more instantiations of bots controlled in the game session by the game server(s) 602. For example, a bot manager (e.g., the bot manager 130 of FIG. 1) may control an instantiation of a bot in the game session according to the playstyle patterns of a user. As a result, the frame of the game session that is being rendered may include the bot and/or may include a change to the virtual environment of the game session that resulted from the bot. The encoder 616 may then encode the display data to generate encoded display data and the encoded display data may be transmitted to the client device 604 over the network(s) 606 via the communication interface 618. The client device 604 may receive the encoded display data via the communication interface 620 and the decoder 622 may decode the encoded display data to generate the display data. The client device 604 may then display the display data via the display 624.

Figure 7:
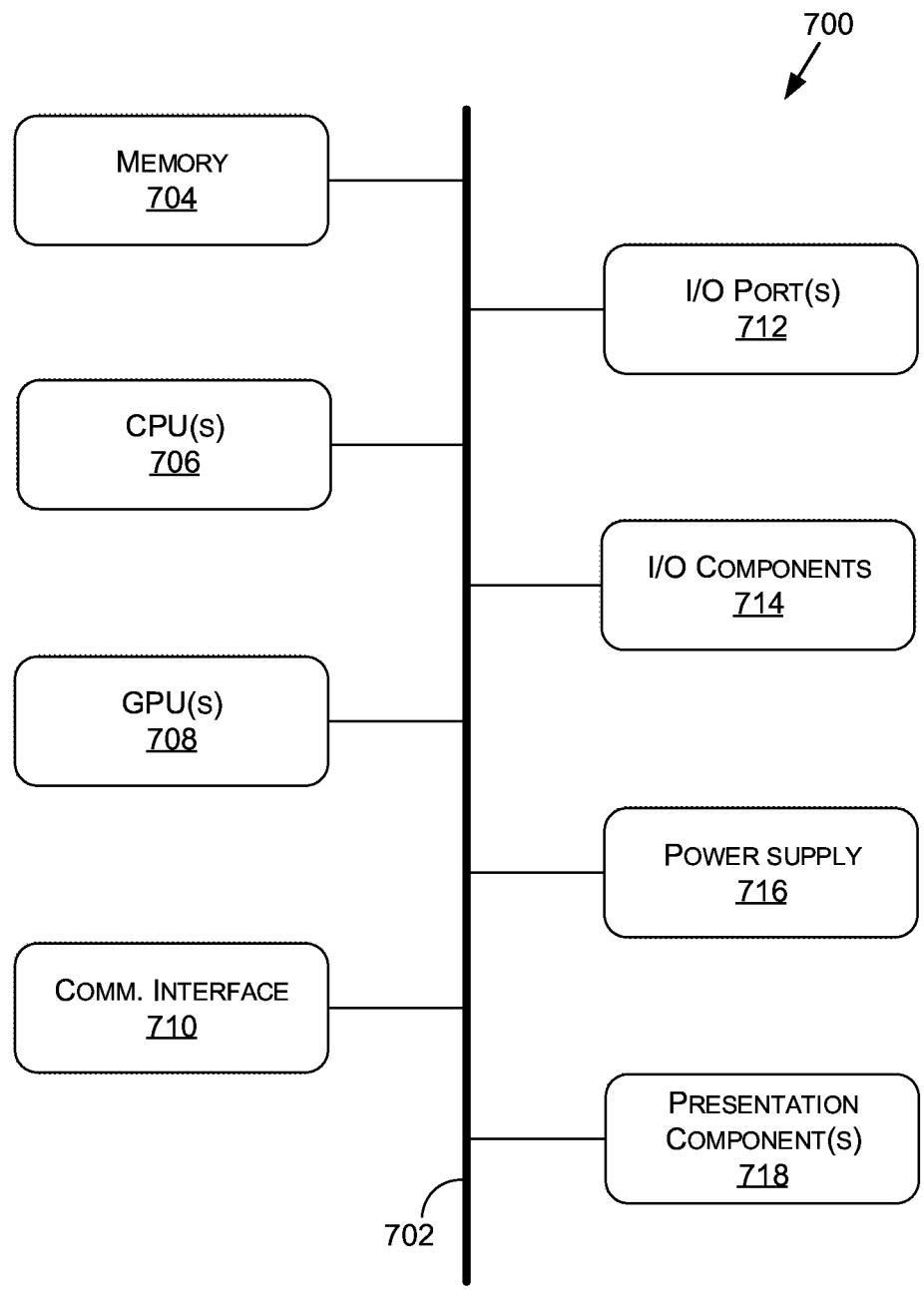
FIG. 7 is a block diagram of an example computing environment suitable for use in implementing some embodiments of the present disclosure.

FIG. 7 is a block diagram of an example computing device 700 suitable for use in implementing some embodiments of the present disclosure. Computing device 700 may include a bus 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)).

Although the various blocks of FIG. 7 are shown as connected via the bus 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The bus 702 may represent one or more busses, such as an address bus, a data bus, a control bus, or a combination thereof. The bus 702 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 704 may include any of a variety of computer-readable media. The computer-readable media may be any available media that can be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an ARM processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data. The display memory may be included as part of the memory 704. The GPU(s) 708 may include two or more GPUs operating in parallel (e.g., via a link). When combined together, each GPU 708 can generate pixel data for different portions of an output image or for different output images (e.g., a first GPU for a first image and a second GPU for a second image). Each GPU can include its own memory, or can share memory with other GPUs.

In examples where the computing device 700 does not include the GPU(s) 708, the CPU(s) 706 may be used to render graphics.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving first game session data corresponding to a prior game session of a game application, the prior game session having a first user and a second user as participants;
based at least in part on the first game session data corresponding to the prior game session, executing a new instantiation of the prior game session to include the first user as a participant; and
instantiating a bot corresponding to the second user within the new instantiation of the prior game session, the instantiating including:
determining a subset of the first game session data associated with the second user;
comparing one or more playstyle characteristics of the second user determined using the subset of the first game session data to the one or more playstyle characteristics from one or more user profiles of other users;
selecting one or more machine learning models from the one or more user profiles of the other users based at least in part on the comparing; and
controlling the bot within the new instantiation of the prior game session using the one or more machine learning models and second game session data corresponding to the new instantiation of the prior game session.

2. The method of claim 1, wherein the prior game session is associated with a game mode of the game application, and the one or more playstyle characteristics are associated with the second user when participating in the game mode of the game application.

3. The method of claim 1, wherein the new instantiation is started from a requested time within the prior game session.

4. The method of claim 1, wherein the new instantiation is executed with one or more requested changes to a loadout of the first user.

5. The method of claim 1, wherein at least one of the one or more machine learning models is trained using at least one of reinforcement learning or inverse reinforcement learning.

6. The method of claim 1, wherein the one or more playstyle characteristics are determined based at least in part on input data representative of inputs to one or more input/output components of one or more client devices associated with the second user during the plurality of game sessions.

7. The method of claim 1, wherein the controlling the bot includes using outputs of the one or more machine learning models generated based at least in part on the second game session data.

8. The method of claim 1, wherein the second game session data comprises image data generated during the new instantiation of the prior game session.

9. A method comprising:
storing first game session data corresponding to a game session of a game application participated in by a first user;
receiving, from a client device associated with a second user, a request to play in a new instantiation of the game session of the game application against a bot corresponding to the first user;
determining a subset of the first game session data associated with the first user;
comparing one or more playstyle characteristics determined using the subset of the first game session data to the one or more playstyle characteristics from one or more user profiles of other users;
selecting one or more machine learning models from the one or more user profiles of the other users based at least in part on the comparing, the one or more machine learning models trained to compute outputs for controlling the bot according to learned playstyle patterns from the one or more user profiles;
executing, based at least in part on the first game session data, the new instantiation of the game session including the second user as a participant and an instantiation of the bot corresponding to the first user; and
controlling the bot within the new instantiation of the game session based at least in part on output data computed using the one or more machine learning models based at least in part on second game session data corresponding to the new instantiation of the game session.

10. The method of claim 9, wherein the controlling the bot includes applying the second game session data to the one or more machine learning models or one or more additional machine learning models.

11. The method of claim 9, wherein third game session data used to train the one or more machine learning models includes image data generated during a plurality of previous game sessions of the game application and user inputs mapped to one or more frames of the image data.

12. The method of claim 9, wherein the request identifies a time within the game session to start the new instantiation, and the new instantiation of the game session is loaded using a subset of the first game session data of the game session representative of the game session at the time.

13. The method of claim 9, wherein the selecting the one or more machine learning models from the one or more user profiles of the other users is based at least in part on determining that the first user does not have a corresponding user profile.

14. The method of claim 9, wherein the request to play in the new instantiation of the game session of the game application includes an adjustment to one more characteristics of the game session for the new instantiation of the game session, the one or more characteristics including one or more of items, inventory, health, or location within a game environment for the second user.

15. A method comprising:
training at least one machine learning model to learn aggregate playstyle patterns of a user category based at least in part on historical game session data representative of game sessions of a game application that are participated in by a plurality of users and identified based at least in part on the users being associated with a user category;
receiving, from a device associated with a first user, a request to play in a new instantiation of previously played game session of the game application participated in by the first user and a second user;

executing, based at least in part on first game session data corresponding to the previously played game session, the new instantiation of the game session including the first user and an instantiation of a bot corresponding to the second user; and determining a subset of the first game session data associated with the second user;

comparing one or more playstyle characteristics determined using the subset of the first game session data to the one or more playstyle characteristics from one or more user profiles of the plurality of users;

selecting the at least one machine learning model from the one or more user profiles of the plurality of users based at least in part on the comparing; and controlling the bot within the new instantiation of the game session based at least in part on output data computed using the at least one machine learning model and based at least in part on second game session data corresponding to the new instantiation of the game session.

16. The method of claim 15, further comprising determining the historical game session data associated with the plurality of users, wherein the determining includes, for an individual game session of the game sessions that includes an associated user associated with the user category and an unassociated user not associated with the user category, identifying the historical game session data as a subset of a larger set of game session data for the single game session associated with the associated user.

17. The method of claim 15, further comprising generating the historical game session data associated with the plurality of users based at least in part on filtering out portions of a larger set of game session data that corresponds to at least one unassociated user that is not associated with the user category.

18. The method of claim 15, wherein the aggregate playstyle patterns are representative of identified shared playstyle characteristics of the plurality of users of the user category.

19. The method of claim 15, wherein the user category includes users associated with at least one of:
   a geographically bounded area;
   an experience level within the game;
   a national rank; or
   a world rank.

20. The method of claim 15, wherein the request indicates a time within the game session to start the new instantiation of the game session.

* * * * *